United States Patent
Nishiyama et al.

[19]
[11] Patent Number: 5,909,385
[45] Date of Patent: Jun. 1, 1999

[54] MULTIPLYING METHOD AND APPARATUS

[75] Inventors: Takahiro Nishiyama, Ebina; Hiromichi Yamada, Hadano, both of Japan

[73] Assignee: Hitachi, Ltd., Tokyo, Japan

[21] Appl. No.: 08/831,297

[22] Filed: Apr. 1, 1997

[30] Foreign Application Priority Data

Apr. 1, 1996 [JP] Japan .................................. 8-079178

[51] Int. Cl.⁶ ........................................................ G06F 7/50
[52] U.S. Cl. ..................... 364/760.03; 708/497; 708/503
[58] Field of Search ........................ 364/760.03, 760.04, 364/760.05, 760.01, 760.02, 748.03, 745.02, 757, 748.09

[56] References Cited

U.S. PATENT DOCUMENTS

| | | | |
|---|---|---|---|
| 4,791,601 | 12/1988 | Tanaka | 364/760.03 |
| 5,038,315 | 8/1991 | Rao | 364/760.03 |
| 5,251,167 | 10/1993 | Simmonds et al. | 364/760.03 |
| 5,506,799 | 4/1996 | Nakao | 364/760.01 |
| 5,561,810 | 10/1996 | Ohtomo | 364/760.01 |
| 5,696,711 | 12/1997 | Makineni | 364/748.03 |
| 5,761,103 | 6/1998 | Oakland et al. | 364/748.03 |

FOREIGN PATENT DOCUMENTS 5265714   10/1993   Japan .

OTHER PUBLICATIONS

Patterson et al *Computer Architecture A Quantitative Approach* 1990 pp. A42–A44.

*Primary Examiner*—David H. Malzahn
*Attorney, Agent, or Firm*—Antonelli, Terry, Stout & Kraus, LLP

[57] ABSTRACT

A multiplying apparatus includes a Booth decoder for performing a second-order Booth decode on a multiplier, a Booth selector for generating a partial product except the two high-order digits from the output of the decoder and a multiplicand, a partial product corrector for correcting the two high-order digits of the partial product based on the multiplier and the multiplicand and outputting the corrected result, for cancelling a sign corrected portion of the negative partial product, and a carry save adder for being inputted with the outputs of the Booth selector and the outputs of the corrector and adding them.

28 Claims, 41 Drawing Sheets

FIG. 7

| INPUT | | | SORT OF PARTIAL PRODUCT | BIT SEQUENCE (54 DIGITS) OF PARTIAL PRODUCT | | | | | | | | |
|---|---|---|---|---|---|---|---|---|---|---|---|---|
| $Y_{j-1}$ | $Y_j$ | $Y_{j+1}$ | | $P_0$ | $P_1$ | $P_2$ | $P_3$ | ...... | $P_{50}$ | $P_{51}$ | $P_{52}$ | $P_{53}$ |
| 0 | 0 | 0 | 0 | 0 | 0. | 0 | 0 | ...... | 0 | 0 | 0 | 0 |
| 0 | 0 | 1 | 1X MULTIPLICAND | 0 | 1. | $X_1$ | $X_2$ | $X_3 \cdots\cdots$ | $X_{50}$ | $X_{51}$ | $X_{52}$ | 0 |
| 0 | 1 | 0 | 1X MULTIPLICAND | 0 | 1. | $X_1$ | $X_2$ | $X_3 \cdots\cdots$ | $X_{50}$ | $X_{51}$ | $X_{52}$ | 0 |
| 0 | 1 | 1 | 2X MULTIPLICAND | 0 | $X_1.$ | $X_2$ | $X_3 \cdots\cdots$ | | $X_{50}$ | $X_{51}$ | $X_{52}$ | 0 |
| 1 | 0 | 0 | −2X MULTIPLICAND | 0 | $\overline{X_1}.$ | $\overline{X_2}$ | $\overline{X_3} \cdots\cdots$ | | $\overline{X_{50}}$ | $\overline{X_{51}}$ | $\overline{X_{52}}$ | 1 |
| 1 | 0 | 1 | −1X MULTIPLICAND | 1 | $\overline{X_1}.$ | $\overline{X_1}$ | $\overline{X_2}$ | $\overline{X_3} \cdots\cdots$ | $\overline{X_{50}}$ | $\overline{X_{51}}$ | $\overline{X_{52}}$ | 1 |
| 1 | 1 | 0 | −1X MULTIPLICAND | 1 | 0. | $\overline{X_1}$ | $\overline{X_2}$ | $\overline{X_3} \cdots\cdots$ | $\overline{X_{50}}$ | $\overline{X_{51}}$ | $\overline{X_{52}}$ | 1 |
| 1 | 1 | 1 | −0 | 0 | 0. | 0 | 0 | ...... | 0 | 0 | 0 | 0 |

LEAST SIGNIFICAND DIGIT TO BE ADDED WHEN GENERATING A TWO'S COMPLEMENT

FIG. 21B

| INPUT | | | SORT OF PARTIAL PRODUCT | CORRECTED TWO DIGITS | |
|---|---|---|---|---|---|
| $Y_m$ | $Y_{m+1}$ | $Y_{m+2}$ | | $R(n,0)$ | $R(n,1)$ |
| 0 | 0 | 0 | 0 | 0 | 0 |
| 0 | 0 | 1 | 1×MULTIPLICAND | 0 | 0 |
| 0 | 1 | 0 | | 0 | 1 |
| 0 | 1 | 1 | 2×MULTIPLICAND | x1 | $\overline{x1}$ |
| 1 | 0 | 0 | -2×MULTIPLICAND | 0 | $\overline{x1}$ |
| 1 | 0 | 1 | -1×MULTIPLICAND | 0 | 1 |
| 1 | 1 | 0 | | 1 | 0 |
| 1 | 1 | 1 | -0 | 1 | 1 |

FIG. 22A $$\begin{array}{r} 1.\ X_1\ X_2\ \cdots\ X_{52} \\ \times)\ 1.\ Y_1\ Y_2\ \cdots\ Y_{52} \\ \hline \end{array}$$

$$+)\quad A_{052}A_{152}A_{252}\ \cdots\ A_{5252}$$
$$\vdots$$
$$\begin{array}{r} A_{01}A_{11}A_{21}\ \cdots\ A_{521} \\ +)\quad 1\ X_1\ X_2\ \cdots\ X_{52} \\ \hline M_V\ M_0\ M_1\ \cdots\ M_{51}M_{52}\ \cdots\ M_{104} \end{array}$$

↑ ↑      ↑ ↑

DOUBLE-PRECISION    ROUNDING POSITION
MOST SIGNIFICANT
DIGIT

FIG. 22B $$\begin{array}{r} 1.\ X_1\ X_2\ \cdots\ X_{23}\ 0\ \cdots\ 0\ 0 \\ \times)\ 0.\ 0\ \cdots\ 0\ \ 0\ 1.Y_1Y_2\cdots Y_{23} \\ \hline \end{array}$$

$$+)\quad A_{023}A_{123}A_{223}\cdots A_{2323}$$
$$\vdots$$
$$\begin{array}{r} A_{01}A_{11}\ \cdots\ A_{231} \\ +)\quad 1\ X_1\ X_2\ \cdots X_{23} \\ \hline M_V\ M_0\ M_1\ \cdots\ M_{28}M_{29}\ \cdots\ M_{51}M_{52}\ \cdots\ M_{104} \end{array}$$

↑ ↑    ↑ ↑

SINGLE-PRECISION   ROUNDING
MOST SIGMIFICANT   POSITION
DIGIT

FIG. 22C $$
\begin{array}{r}
1.\ X_1\ X_2 \cdots X_{23}\ 0\ \cdots\ 0\ 0 \\
\times)\ 0.\ 0\quad \cdots\ 0\quad 0\ 1.Y_1 Y_2 \cdots Y_{23} \\
\hline
+)\quad A_{023} A_{123} A_{223} \cdots A_{2323} \\
\vdots \\
A_{01} A_{11}\ \cdots\ A_{231} \\
\xleftarrow{29\ \text{BITS}} 1\ X_1\ X_2 \cdots X_{23} \\
+)\quad 1\ 1\ \cdots\ 1\ 0 \leftarrow \text{CORRECTION DIGITS} \\
\hline
M_V\ M_O\ M_I\ \cdots M_{28} M_{29} \cdots M_{51} M_{52} \qquad\qquad M_{104}
\end{array}
$$

↑↑ COMMON MOST SIGMIFICANT DIGITS

↑↑ SINGLE-PRECISION MOST SIGNIFICANT DIGIT

↑↑ ROUNDING POSITION

FIG. 22D

EXECUTION SIGNAL OF SINGLE-PRECISION OPERATION   414

| | NO CARRY FROM LOWER HALF DIGITS | CARRY FROM LOWER HALF DIGITS | |
|---|---|---|---|
| CASE 1 | 0 1. $E_1 E_2 \cdots E_{52}$ (SIGNAL520)<br>$\boxed{1. E_1 E_2 \cdots E_{52}}$ (SIGNAL515)<br>$\boxed{1. E_1 E_2 \cdots E_{52}}$ | 0 1. $F_1 F_2 \cdots F_{52}$ (SIGNAL524)<br>$\boxed{1. F_1 F_2 \cdots F_{52}}$ (SIGNAL516)<br>$\boxed{1. F_1 F_2 \cdots F_{52}}$ | BEFORE NORMALIZING SHIFT<br>NORMALIZING SHIFT BY SIGNAL 520<br>NORMALIZING SHIFT BY SIGNAL 524 |
| CASE 2 | 0 1. 1 1 $\cdots$ 1 (SIGNAL520)<br>$\boxed{1. 1 1 \cdots 1}$<br>0. 1 1 $\cdots$ 1 | 1 0. 0 0 $\cdots$ 0<br>1 0. 0 0 $\cdots$ 0 (SIGNAL516)<br>$\boxed{1. 0 0 \cdots 0}$ | BEFORE NORMALIZING SHIFT<br>NORMALIZING SHIFT BY SIGNAL 520<br>NORMALIZING SHIFT BY SIGNAL 524 |
| CASE 3 | 1 $E_0$. $E_1 E_2 \cdots E_{52}$ (SIGNAL515)<br>$\boxed{1. E_0 E_1 \cdots E_{51}}$<br>1. $E_0 E_1 \cdots E_{51}$ | 1 $F_0$. $F_1 F_2 \cdots F_{52}$ (SIGNAL524)<br>$\boxed{1. F_0 F_1 \cdots F_{51}}$ (SIGNAL516)<br>1. $F_0 F_1 \cdots F_{51}$ | BEFORE NORMALIZING SHIFT<br>NORMALIZING SHIFT BY SIGNAL 520<br>NORMALIZING SHIFT BY SIGNAL 524 |

MULTIPLYING METHOD AND APPARATUS

BACKGROUND OF THE INVENTION

1. Field of the Invention

The present invention relates to a multiplying method and apparatus, and more particularly to the methods and the apparatuses for adding a partial product and for performing a floating point multiplication.

2. Description of the Related Art

The description will be oriented to (1) addition of partial products, (2) detection of the most significant digit, and (3) normalizing shift implementation in the prior art.

At first, the conventional addition of partial products will be described below. The addition of partial products executed in a sum of products or a multiplication may take a Booth decoding operation for the purpose of reducing the number of partial products and thereby speeding up the addition of partial products. The Booth decoding operation has been discussed in :David A. Patterson, John L. Hennessy, "Computer Architecture A Quantitative Approach", A42 to A44, for example. Later, as an example, consider a multiplication of fractions of a double-precision format defined in ANSI/IEEE Std 754. The fraction is represented in binary notation.

Concretely, with reference to FIGS. 6 to 8, the description will be expanded on the assumption that a 53-digit multiplicand is X, a 53-digit multiplier is Y, and Y is decoded with X. FIG. 6 shows inputs to a Booth decoder. As shown, the operation is executed to range the 53-digit Y (implicit '1' (the most significant digit of the fraction which is omitted), Y1, Y2, . . . , Y52) from the left digit, decode each three digits of the Y (termed second order decode), and multiply the decoded result by the multiplicand X for producing one partial product. Finally, 27 partial products from the partial products 0 to 26 are produced. The sorts of the partial products are determined by the three-digit pattern of the multiplier Y as shown in FIG. 7. FIG. 7 shows the relation among the inputs to the Booth decoder, the sorts of the partial products, and the bit sequences. For example, when the three digits of the multiplier is 011, the partial product is a double of the multiplicand, that is, the multiplicand shifted by one to left. When the three digits of the multiplier is 100, the partial product is the multiplicand multiplied by −2, that is, the multiplicand that is represented in two's complement and shifted by one to left.

Each sort of partial product is represented by a 53-digit X (implicit '1', X1, X2, . . . , X52 ranged in sequence from the leftmost position). As noted above, since the partial product is represented in two's complement, the two sorts of partial products, the multiplicand multiplied by −1 and the multiplicand multiplied by −2, are represented by the negatives of X bits and '1' to be added to the least significant bit. Each partial product is a 54-digit bit sequence. The digits having the same weight contained in the bit sequence, that is, the digits at the same position from the floating point are added to each other for obtaining the result.

However, when adding a number having a greater digits upper than the most significant digit of a negative partial product to the negative partial product such as the multiplicand multiplied by −0, −1, or −2 (hereafter termed in mathematical expression like −0 times multiplicand, −1 times multiplicand, −2 times multiplicand), a sign correction is executed for the digits upper than the most significant digit of the negative partial product. (For example, when the negative partial product consists of four bits and is 1101 (−3), the four-bit sign correction is executed for the upper significant digits for deriving the resulting 8-bit value, concretely, 11111101). Then, the addition is executed for all digits containing the sign correction digits. Hence, when adding the partial products, as shown in FIG. 8, the addition is required to perform for the portion including the sign correction portion.

As means for adding the partial products shown in FIG. 8, a carry save addition is used. As shown in FIG. 10, the carry save adder gives rise to two kinds of outputs, sum and carry. As to the output of the carry, the carry may be negative, that is, the carry may contain digits left of the most significant digit of the partial product. Then, consider the carry propagate addition of two outputs from the carry save adder and a third number. In case that the third number has digits upper than the most significant digit of the carry save adder and the carry is negative, the sign correction is executed to fill with '1' the left digits of the most significant digit of the carry. The addition has to be done for all digits containing the sign correction digits. Hence, it is necessary to apply the carry propagate adder to all digits as shown in FIG. 10.

The conventional partial product adder is shown in FIG. 34. A multiplier 3210 is applied to a Booth decoder 3201 and a least significant digit generator 3203. The multiplicand 3211 is applied to a Booth selector 3202. The Booth decoder 3201 generates a Booth decode signal 3212 from the multiplier 3210. The Booth selector 3202 generates a signal 3214 for representing a partial product from the Booth decode multiplicand 3211 and the signal 3212. The least significant digit generator 3203 generates a signal for representing the least significant digit to be added for generating a two's complement.

A numeral 3204 denotes a sign correction generator 3204, which generates a signal 3215 for representing the sign correction portion shown in FIG. 8 from the Booth decode signal 3212. A numeral 3205 denotes a carry save adder, which performs a carry save addition of the digits having the same weights contained in the signals 3213, 3214 and 3215, for generating a sum 3216 and a carry 3217 of the partial product addition.

The conventional floating point multiplying apparatus is shown in FIG. 33. In this multiplying apparatus, a Booth decoder 3201, a Booth selector 3202, a least significant digit generator 3203, a sign correction generator 3204, and a carry save adder 3205 are the same as those described with reference to FIG. 34. A numeral 3306 denotes a carry propagate adder, which performs a carry propagate addition of the signals 3216 and 3217 and outputs a signal 3318. A numeral 3307 denotes a normalizing and rounding unit, which normalizes and rounds the signal 3318 and outputs the resulting signal 3319 of the multiplying apparatus.

The conventional floating point operating unit for sum of products is shown in FIG. 32. In the summing unit, a Booth decoder 3201, a Booth selector 3202, a least significant digit generator 3203, a sign correction generator 3204, and a carry propagate adder 3205 are the same as the foregoing components. The carry propagate adder 3206 performs a carry propagate addition o the signals 3216 and 3217 and a third number 3218 containing the sign correction digits shown in FIG. 10 for generating a signal 3219. Then, a normalizing and rounding unit 3207 normalizes and rounds the signal 3219 and output the resulting signal 3220 of the operating unit for a sum of products.

In turn, the description will be oriented to the conventional detection of the most significant digit (leftmost digit).

Consider a rounding unit commonly used for a multiplying apparatus for treating a number of an IEEE double-precision format and a number of an IEEE single-precision format. The match of a rounding position between the single-precision number and the double-precision number results in making the positions of the most significant digits different from each other. In overcoming this drawback, it is necessary to provide a step of determining the most significant digit. An example of the method for detecting the most significant digit is disclosed in JP-A 5-265714. As to the different precision floating point numbers, the respective most significant digits are positioned differently after the addition of the partial products. Hence, a circuit for selecting the most significant digit is added for overcoming the drawback resulted from the variety of the precisions.

FIG. 35 shows the conventional floating point multiplying apparatus additionally provided with the circuit for selecting the most significant digit. A partial product generator 3501 generates a signal 3512 for representing a partial product from a multiplicand 3511 and a multiplier 3510. A carry save adder 3502 performs a carry save addition of the signal 3512 for deriving two output signals 3513 and 3514. A carry propagate adder 3503 performs a carry save addition of the signals 3513 and 3514 and generates the signal 3515 for representing a double-precision most significant digit and a single-precision most significant digit and the added result signal 3516.

A selector 3504 receives a signal 3517 for representing execution of the single-precision multiplication, its inverted signal 3518, and the double-precision and single-precision most significant digit signal 3515 and outputs a signal 3519 representing the single-precision most significant digit if the single-precision multiplication is currently executed or the double-precision most significant digit if the double-precision multiplication is currently executed. A normalizing and rounding unit 3505 receives the added result signal 3516 and the signal 3519, normalizes and rounds the signals, and then outputs the multiplied result (fraction) signal 3520.

Next, the conventional normalizing shift will be described below.

Consider the following carry propagate addition of the fraction. The carry propagate addition is executed after dividing the fraction into upper half digits and lower half digits. Two addition of the upper half digits are performed according to the carry from the lower half digits, concretely, one addition of the upper half digits for the case that a carry from the lower half digits exists and the other addition for the case that no carry from the lower half digits exists. One of the addition results is selected based on the actual carry. In this case, the normalizing shift is controlled using the the most significant digit of the addition result selected based on the carry from the lower half digits.

FIG. 36 shows this sort of floating point multiplying apparatus of the prior art. A numeral 3601 denotes a partial product generator and carry save adder, both of which operate to generate a partial product from a multiplier 3612 and a multiplicand 3612 and perform a carry save addition about the partial products for feeding a sum signal 3613 and a carry signal 3614. An upper half digit adder (A+B) 3602 adds the upper digits A of the signal 3613 to the upper digits B of the signal 3614 and feed a signal 3615 that corresponds to a carry propagate addition if no carry from the lower half digits exists. An upper half digit adder (A+B+1) 3603 adds the upper digits A of the signal 3613 to the upper digits B of the signal 3614 and '1' and feeds a signal 3616 that corresponds to a carry propagate addition if any carry from the lower half digit exists. A lower half digit adder 3604 adds the lower digits of the signal 3613 to the lower digits of the signal 3614 for generating a carry signal 3617.

An added result selector 3605 selects the signal 3515 or 3616 based on a carry signal 3617 and feeds the most significant digit signal 3618 and the signal 3619. A normalizing unit 3606 performs a normalizing shift on the signal 3619 using the most significant digit signal 3618 as a control signal and feeds a multiplied result (fraction) signal 3620.

As described above, the use of the Booth algorithm for the addition of partial products advantageously results in reducing the hardware amount used for the addition of partial products because of the reduction of the partial products in number. Disadvantageously, however, the hardware needs to have an additional sign correction section. Hence, the additional hardware of the sign correction section offsets the effective reduction of the hardware to some extent.

As to the sum of productions, since the sign correction portion of the partial product needs to be added, it is necessary to execute the sign correction for the most significant digit of the carry outputted from the carry save adder and perform addition including the sign correction digits.

As mentioned above, the most significant digit is obtained after the carry is propagated from the least significant digit. Hence, the propagation may make the delaying time longer and thereby is a critical path of the multiplying apparatus. As in the prior art, if the most significant digit detector is used for detecting the most significant digit in the multiplying apparatus that treats the floating point numbers whose precisions are variable to each other, this arrangement may disadvantageously increase the delaying time further and needs a more time for the critical path of the multiplying apparatus.

The normalizing shift control signal used for the conventional normalizing shift is the most significant digit selected according to the carry from the lower half digits. Hence, the most significant digit that needs longer delaying time due to the relevant fan-out in scale, thereby extending the delaying time of the path passing through the most significant digit.

SUMMARY OF THE INVENTION

It is an object of the present invention to provide a partial product adding method and apparatus, a floating point multiplying method and apparatus, and a floating point operating method and apparatus for a sum of products which are arranged to reduce the hardware amount by eliminating the sign correction portion of the partial product generated by the Booth algorithm.

It is a further object of the present invention to provide a floating point multiplying method and apparatus which are arranged to reduce the delaying time of a critical path and treat the different precision floating point numbers.

It is a yet further object of the present invention to provide a floating point multiplying method and apparatus which are arranged to reduce the delaying time of the critical path in length by using as a normalizing shift control signal a signal that is independent of the added result of the lower digits.

In carrying out the object, the present invention is achieved by a partial product adding apparatus for adding partial products produced from a multiplier and a multiplicand including: a Booth decoder for performing a second order Booth decode of the multiplier; a Booth selector for generating a partial product except the upper two digits from the output of the Booth decoder and the multiplicand; a corrector for correcting the upper two digits and feeding the corrected result; a circuit for generating the least significant digit to be added in generating a two's complement based on the multiplier; and a carry save adder for receiving the partial product except the upper two digits generated from the Booth selector, the output of the corrector, and the output of the least significant digit generating circuit and performing the carry save addition of those received signals without any sign correction.

The present invention is achieved by a floating point multiplying apparatus for operating a double-precision and a single-precision floating point numbers including: a partial product generator for generating a double-precision partial product and a single-precision one in a manner to keep the rounding positions at the same digit; a circuit for generating correction digits from a digit corresponding to the most significant digit of the sum of the maximum single-precision partial products to a digit right of the most significant digit of a sum of the maximum double-precision partial products in parallel to the occurrence of the partial product; a carry save adder for adding the partial products generated by the partial product generator to the correction digits; a carry propagate adder for adding the outputs of the carry save adder; and a circuit for normalizing and rounding using the most significant digit commonly used for the double-precision and the single-precision floating point numbers fed from the carry propagate adder.

Further, the present invention is achieved by a floating point multiplying apparatus including: a partial product generator for generating a partial product from a multiplier and a multiplicand; a carry save adder for carry save adding the partial product; a lower half digit adder for carry propagate adding of the lower digits of the output from the carry save adder; a first upper half digit adder for carry propagate adding of the upper digits of the output from the carry save adder in parallel to the addition of the lower digits if no carry is assumed to come from the lower digits; a second upper half digit adder for carry propagate adding of the upper digits of the output from the carry save adder in parallel to the addition of the lower half digits if a carry is assumed to come from the lower half digits; a selector for selecting one of the results of the first and the second upper half digit adders according to the carry from the lower half digits; and a normalizing circuit for utilizing as a control signal the most significant digit output from the first or the second upper half digit adder.

According to the present invention, the partial product addition, the floating point multiplication, or the floating point sum of products is executed to generate a partial product with the second order Booth decode, subtract one from the upper two digits of the first partial product if the second partial product is negative, add one to the digit position of the second partial product corresponding to the digit position from which one is subtracted, and cancelling the sign correction portion of the second partial product generated by the Booth decode. Hence, the foregoing addition, multiplication, or sum does need a sign correction portion of the negative partial product and thus an addition of the sign correction portion, thereby reducing the hardware amount.

According to the present invention, the operation can be executed to cancel the sign correction portion of the negative partial product and calculate the digits that exceed the most significant digits of the value obtained by carry save adding of the partial products without using the carry propagate adder. Hence, the sum of products can be executed with a small amount of hardware.

According to the present invention, the operation is executed to add the correction digits when adding a partial products. Hence, the variable precisions floating point numbers match their most significant digits to the same position and the steps of the critical path, that is, the path for the most significant digit are reduced in number. This leads to the fast floating point multiplication.

According to the present invention, whether or not any carry from the lower digits may be provided, the most significant digit of the upper digit adder for the carry propagate addition is used as part of a control signal for the normalizing circuit. This also leads to the fast floating point multiplication.

BRIEF DESCRIPTION OF THE DRAWINGS

FIG. 7 is a table showing a relation among the inputs to the Booth decoder, the sorts of partial products, and the bit sequences;

FIG. 21B is a table showing a relation among multipliers and upper two bits of the corrected partial product;

FIGS. 22A, 22B, and 22C are explanatory views showing an operation of matching the most significant digits to the same position;

FIG. 22D is a circuit diagram showing a circuit for generating correction digits;

FIG. 30 is a table for explaining cases of a normalizing shift operation;

DESCRIPTION OF THE PREFERRED EMBODIMENTS

Hereafter, an embodiment of the present invention will be concretely described with reference to the appended drawings.

In the following description, the embodiment of the invention will be divided into (I) addition of partial products, (II) matching the most significant digits to the same position, and (III) normalizing shift. The following embodiment is assumed so that a double-precision operation is done with a multiplicand consisting of 53 digits and a multiplier consisting of 53 digits and a single-precision operation is done with a multiplicand consisting of 24 digits and a multiplier consisting of 24 digits. According to the present invention, the digits of the multiplicand or the multiplier are not limited to the aforementioned digits. The actual digits may be greater or smaller than those digits.

In the following description, '·' denotes a logical product (AND). '+' denotes a logical sum (OR), and "⊕" denotes an exclusive OR. A negative of X is represented by $\overline{X}$. Xi is identical with X(i) and Yi is identical with Y(i).

(I) Partial Product Adding Apparatus

Figure 3:
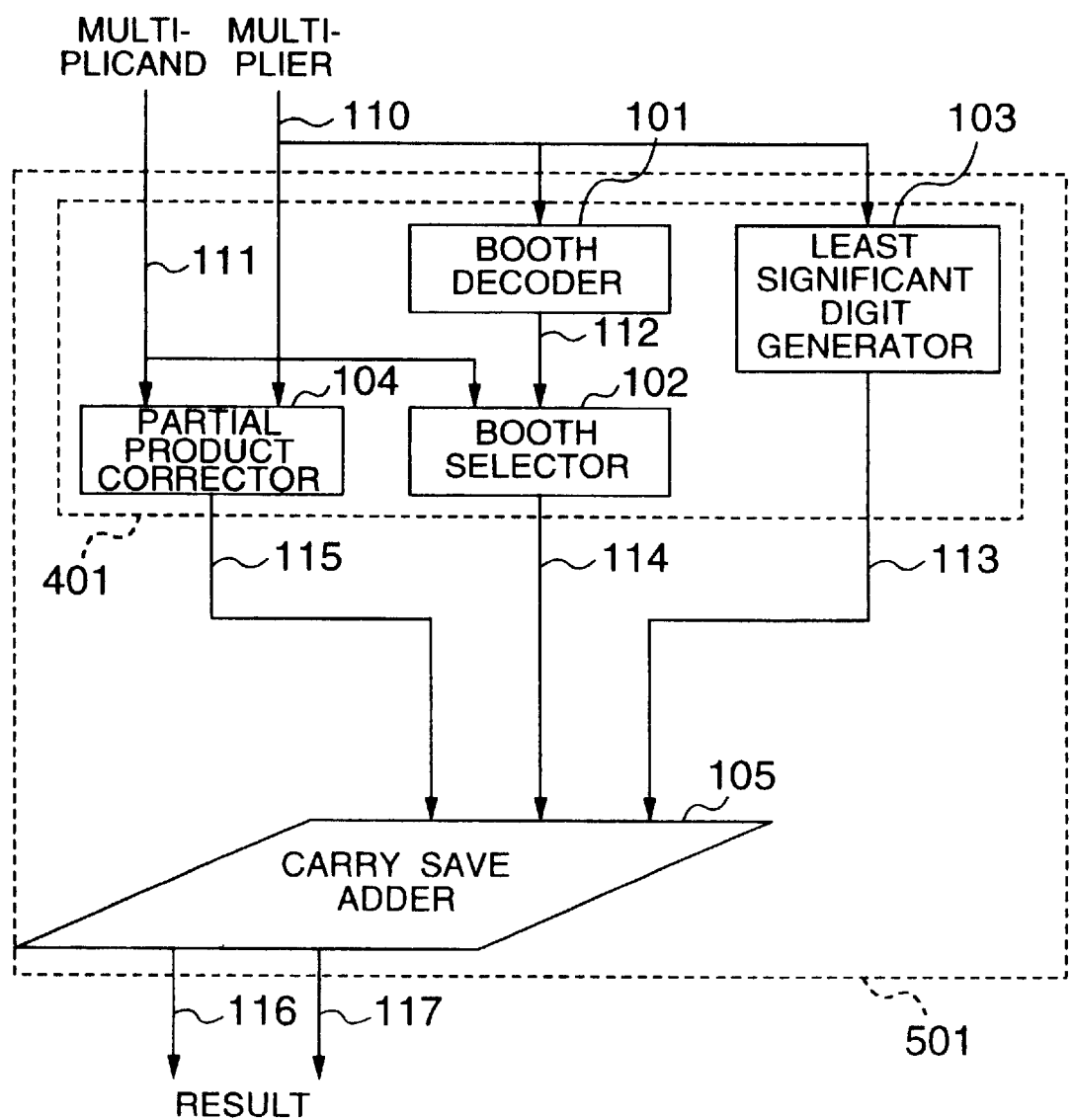
FIG. 3 is a block diagram showing an arrangement of a partial product adding apparatus according to the present invention.

The description will be oriented to the arrangements and the embodiments of a partial product adding apparatus, a floating point multiplying apparatus, and a floating point operating apparatus for a sum of products, those of which employ the addition of partial products. In FIG. 3, a multiplier 110 is applied to a Booth decoder 101, a partial product corrector 104 and a least significant digit generator 103. A multiplicand 111 is applied to a Booth selector 102 and a partial product corrector 104.

Figure 12:
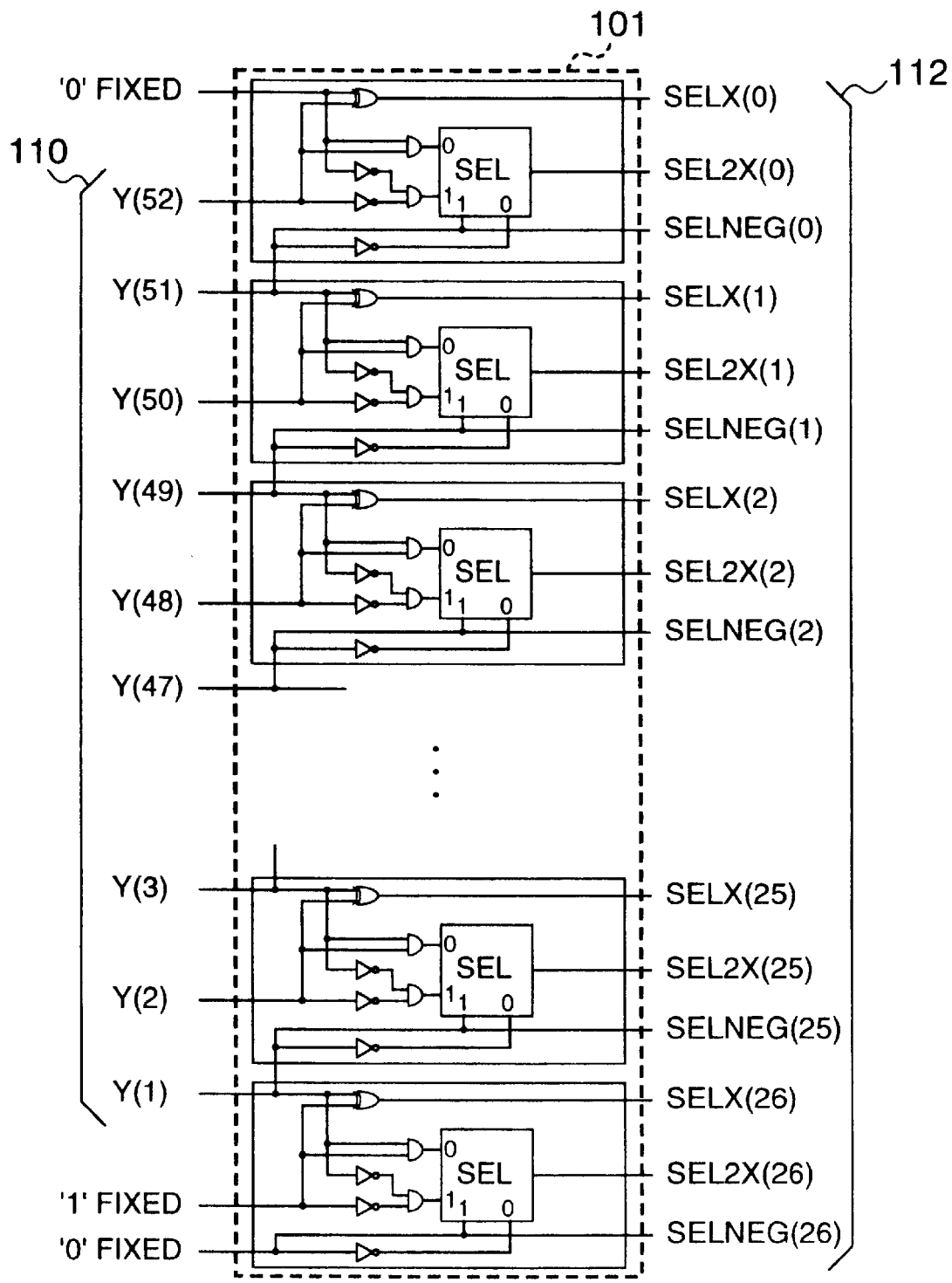
FIG. 12 is a circuit diagram showing an arrangement of the Booth decoder.

FIG. 12 is a block diagram showing the Booth decoder 101. The Booth decoder 101 generates a select signal 112 for the Booth selector 102 from the multiplier 110. Y(1), Y(2), ..., Y(52) are multipliers which are arranged one bit by one bit in order of weight (from left to right).

SELX(i) ($0 \leq i \leq 26$) is a signal that indicates a partial product i is 1 or –1 times multiplicand. SELX(i) is represented on the relation between the input shown in FIG. 7 and the sort of partial product by the following expression 1.

$$SELX(i) = Y(j) \oplus Y(j+1), j=2(26-i) \qquad \text{(expression 1)}$$

where Y(0)=1 and Y(53)=0.

SEL2X(i) ($0 \leq i \leq 26$) is a signal that indicates the partial product i is 2 or –2 times multiplicand (the multiplicand multiplied by 2 or –2). SEL2X(i) is represented on the relation between the input shown in FIG. 7 and the sort of partial product by the expression 2.

$$SEL2X(i) = \overline{Y(j-1)} \cdot Y(j) \cdot Y(j+1) + Y(j-1) \cdot \overline{Y(j)} \cdot \overline{Y(j+1)},$$

$$j=2(26-j) \qquad \text{(expression 2)}$$

where Y(–1)=0, Y(0)=1, and Y(53)=0.

SELNEG(j) ($o \leq i \leq 26$) is a signal that indicates the partial product i is –0, –1, or –2 times multiplicand. SELNEG(i) is represented on the relation between the input shown in FIG. 7 and the sort of partial product by the expression 3.

$$SELNEG(i) = Y(j-1), j=2(26-i) \qquad \text{(expression 3)}$$

where Y(–1)=0.

Figure 13:
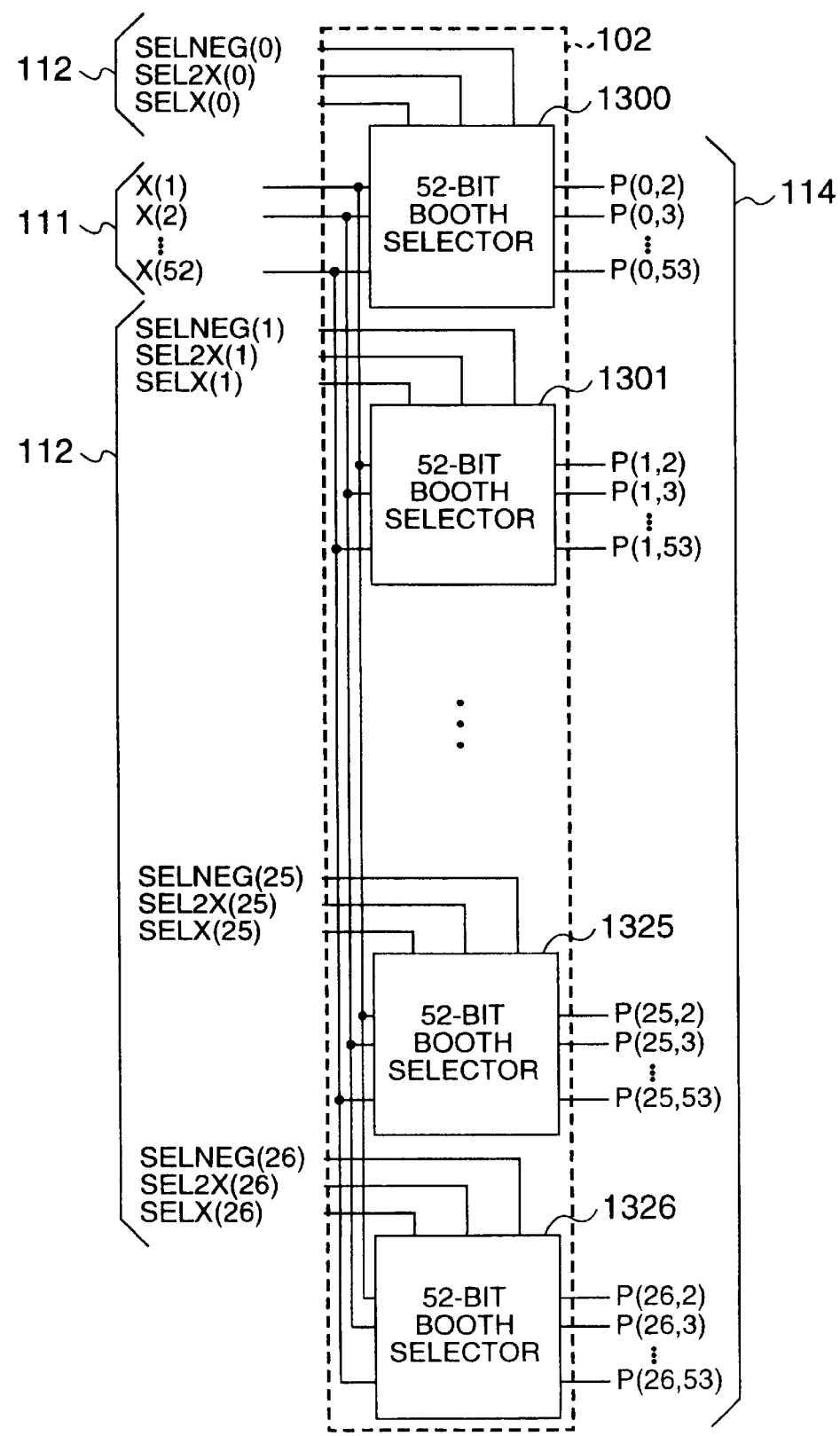
FIG. 13 is a circuit diagram showing an arrangement of a Booth selector.

FIG. 13 is a block diagram showing the Booth selector 102. The Booth selector 102 generates a signal 114 representing all digits of the partial product except the two high-order digits by using the multipliers X denoted by a numeral 111 and the signals SELX, SEL2X, and SELNEG denoted by a numeral 112 and generated in FIG. 12. X(1), X(2), ..., X(52) are multipliers arranged in order of weight. SELX(i), SEL2X(i), and SELNEG(i) ($0 \leq i \leq 26$) are the same signals as those used in FIG. 12. Numerals 1300, 1301, ..., 1326 denote 52-bit Booth selectors of a partial product 0, a partial product 1, ..., a partial product 26. These 52-bit Booth selectors have their respective input and output signals but the same inside circuit arrangements as each other.

The k-th bit of the partial product i is represented by P(i, k). P(0, 2), P(0, 3), ..., P(0, 53) are all digits of the partial product 0 except the two high-order digits, which are arranged in order of weight. Later, P(1, 2), P(1, 3), ..., P(1, 53) are all digits of the partial product 1 except the two high-order digits, and P(26, 2), P(26, 3), ..., P(26, 53) are all digits of the partial product 26 except the two high-order digits.

Figure 14:
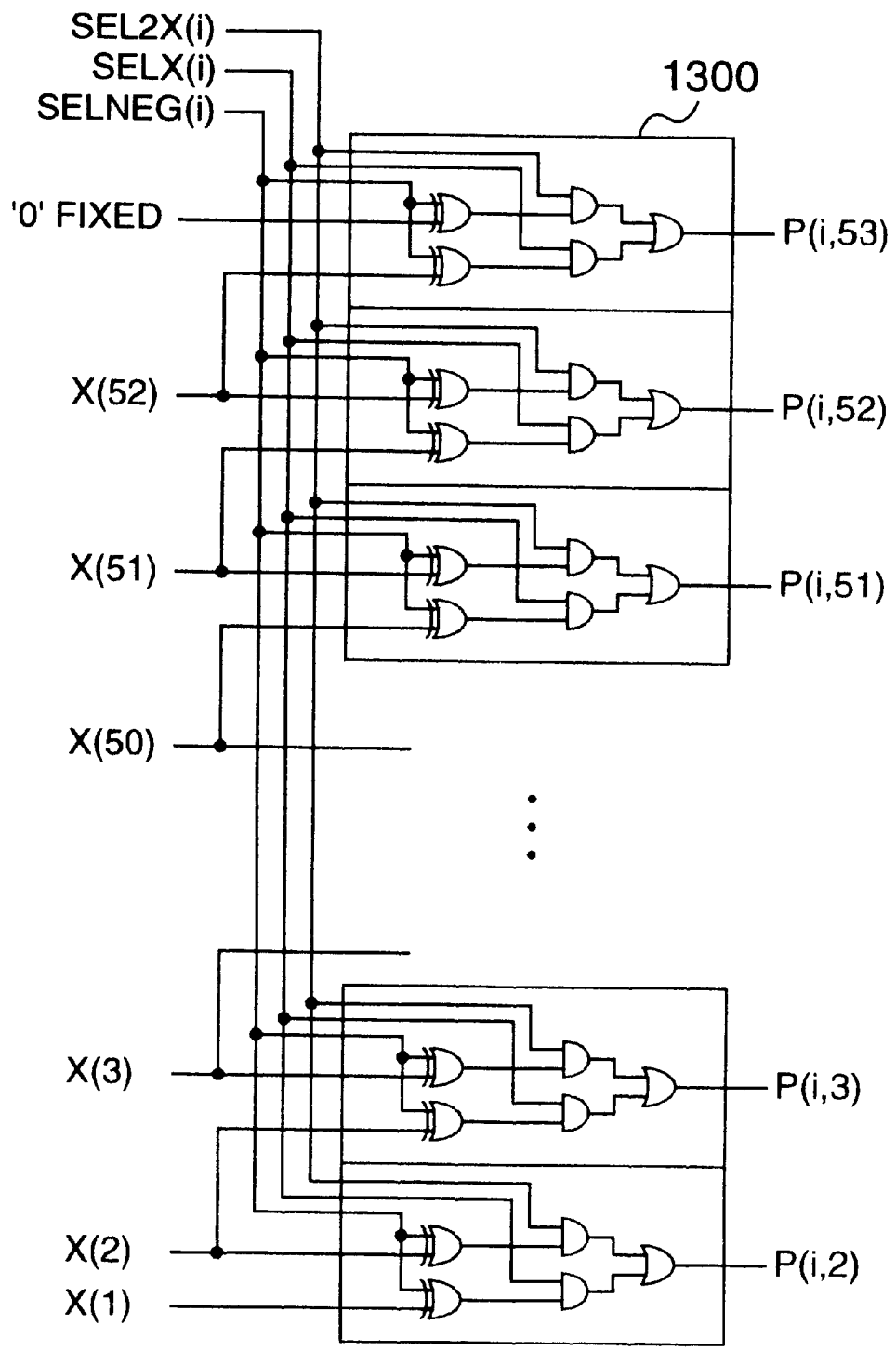
FIG. 14 is a circuit diagram showing a 52-bit Booth selector.

FIG. 14 is a block diagram showing the 52-bit Booth selector used in the arrangement of FIG. 13. In this figure, X(k) ($0 \leq k \leq 52$), SELX(i), SEL2X(i), SELNEG(i), P(i, k) ($0 \leq i \leq 26$, $2 \leq k \leq 53$) are the same as those used in FIG. 13.

P(i, k) ($0 \leq i \leq 26$, $2 \leq k \leq 53$) is obtained as follows. At first, based on the relation between the sorts of products and the bit sequences of the partial products (except the least significant digit to be added when generating a two's complement) shown in FIG. 7, the following results can be derived.

(1) when the sort of partial product i is 0 times multiplicand, P(i, k)=0
(2) when the sort of partial product i is 1 times multiplicand, P(i, k)=X(k−1)
(3) when the sort of partial product i is 2 times multiplicand, P(i, k)=X(k)
(4) when the sort of partial product i is −2 times multiplicand, P(i, k)=$\overline{X(k)}$
(5) when the sort of partial product i is −1 times multiplicand, P(i, k)=$\overline{X(k-1)}$
(6) when the sort of partial product i is −0 times multiplicand, P(i, k)=0 where X(53)=0. Those results may be differently expressed as follows.

Any one of the below-mentioned (a) and (b) meets the condition that P(i, k) is 1.

(a) From (2) and (5), ((the sort of partial product i is 2 or −2 times multiplicand)·((the sort of the partial product i is −0, −1, or −2 times multiplicand) ⊕X(k−1)))=1
(b) From (3) and (4), ((the sort of partial product i is 2 or −2 times multiplicand)·((the sort of partial product i is −0, −1, or −2 times multiplicand) ⊕ X(k)))=1

The logic shown in FIG. 14 is an OR of the above (a) and (b), which is represented by the expression 4.

$$P(i, k) = (SELX(i) \cdot (SELNEG(i) \oplus X(K-1))) + \quad \text{(expression 4)}$$
$$(SEL2X(i) \cdot (SELNEG(i) \oplus X))$$

Figure 15:
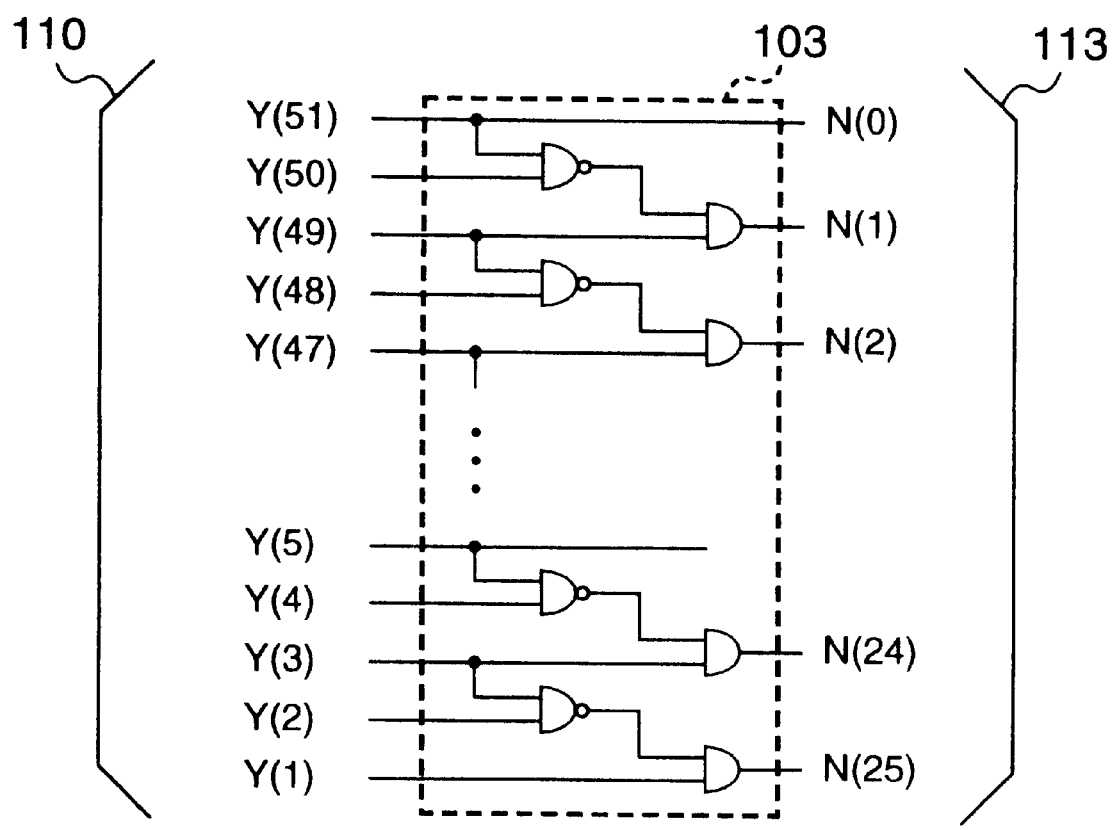
FIG. 15 is a circuit diagram showing an arrangement of a circuit for generating the least significant digit to be added for generating a two's complement.

FIG. 15 is a block diagram showing the least significant digit generator 103 for generating the least significant digit to be added when generating a two's complement. This least significant digit generator 103 generates a signal 113 for representing the least significant digit to be added when generating a two's complement by using the multiplier 110. Y(1), Y(2), . . . , Y(51) are the multipliers which arranged in order of weight. N(i) (0≦i≦25) is the least significant digit to be added when generating a two's complement of each partial product i. N(i) is expressed on the relation between the inputs and the bit sequences of each partial product (which represents the least significant digit to be added when generating a two's complement) by the expression 5.

$$N(i)=Y(j-1)\cdot\overline{Y(j)}\cdot\overline{Y(j+1)}, j=2(26-i) \quad \text{(expression 5)}$$

where: Y(53)=0,
N(0)=Y(51)·$\overline{Y(52)}$·$\overline{Y(53)}$=Y(51)
N(0) does not depend on Y(52) and is determined by Y(51) only.

Figure 16:
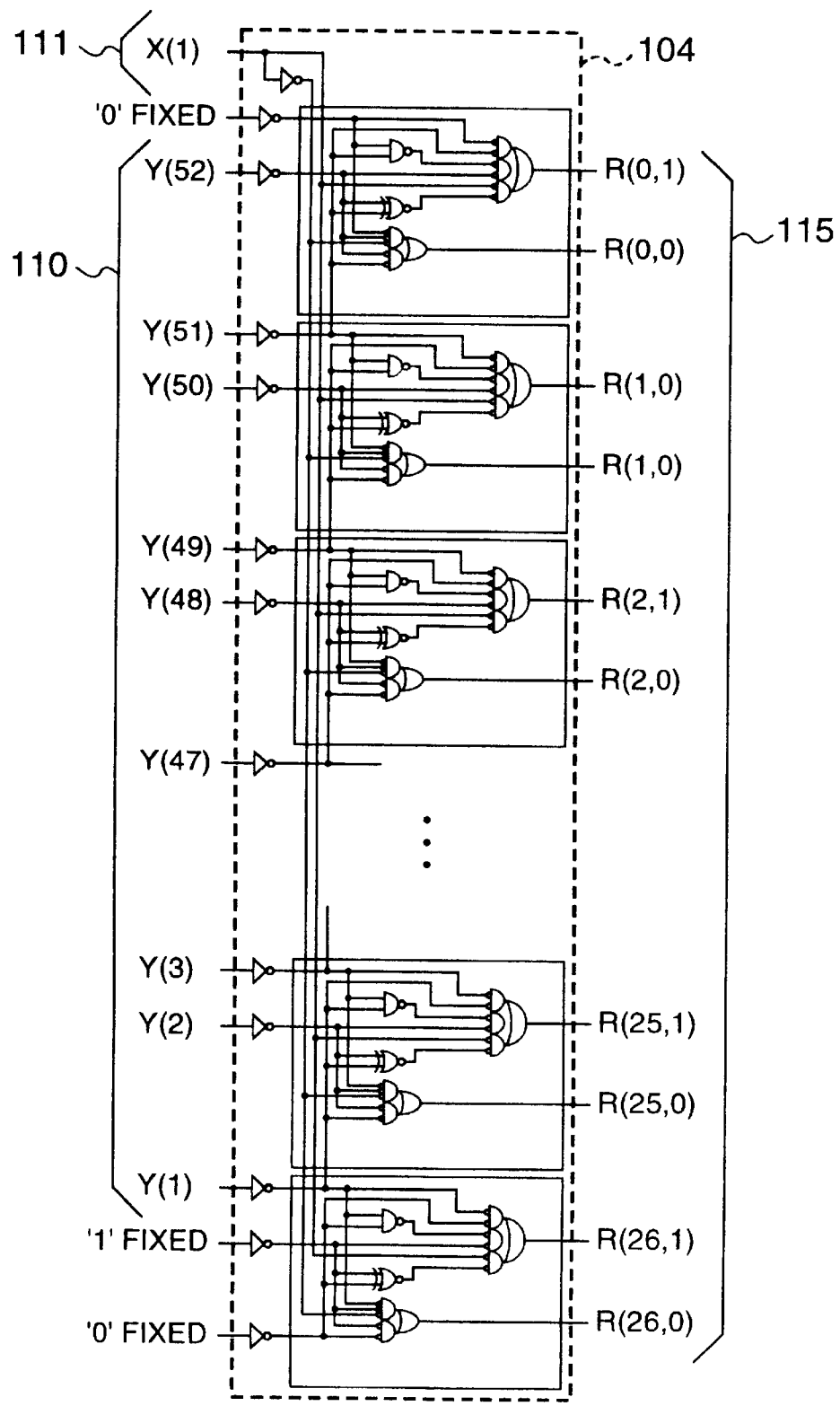
FIG. 16 is a circuit diagram showing an arrangement of a partial product corrector.

FIG. 16 is a block diagram showing the partial product corrector 104. The corrector 104 generates a signal 115 having the corrected two high-order digits of the partial product by using the multiplicand 111 and the multiplier 110. The method for correcting the two high-order digits of the partial product through the effect of this circuit will be described with reference to FIGS. 17 to 21.

Figure 17A:
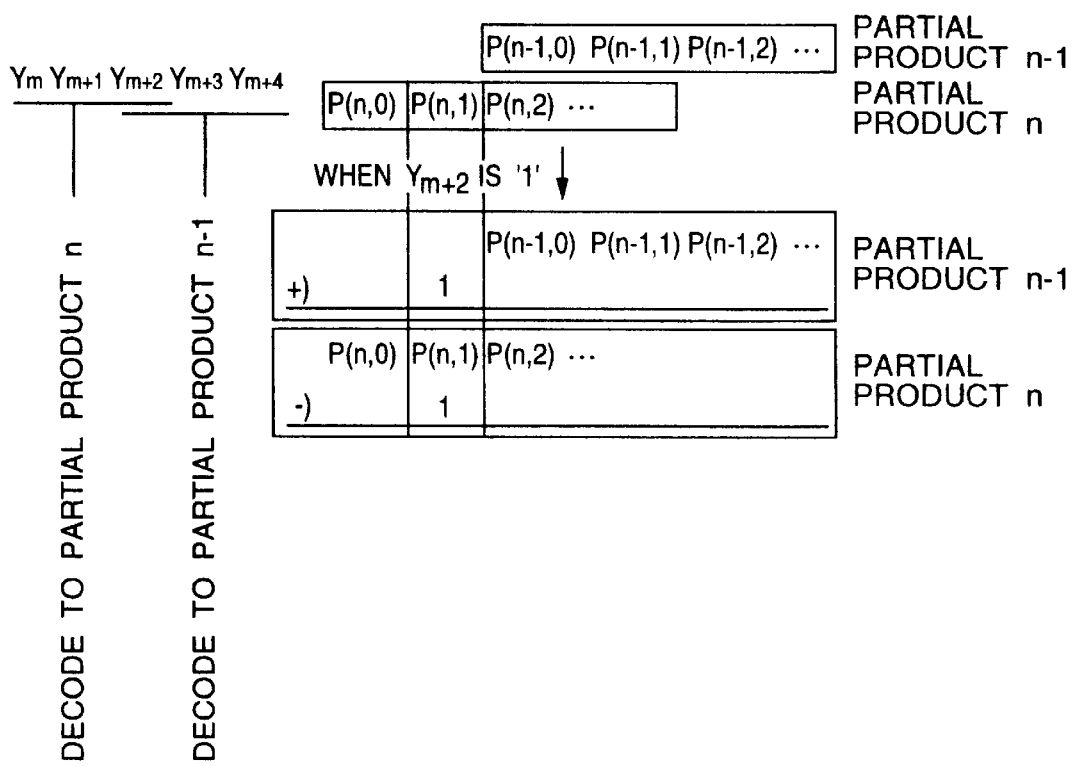
FIGS. 17A and 17B are explanatory views showing the method for correcting a partial product.

The method for correcting the partial product will be shown in FIG. 17A. The partial product n(P(n, 0), P(n, 1) P(n, 2) . . . ) is obtained by decoding Y(m), Y(m+1), and Y(m+2). The partial product n−1 (P(n−1), 0) P(n−1), 1) P(n−1, 2) . . . ) is obtained by decoding Y(m+2), Y(m+3), and Y(m+4). If the partial product n−1 is negative, that is, Y(m+2) is 1, '1' is subtracted from the digit of P(n, 1) of the partial product n and then an equivalent value is added to the partial product n−1. If the partial product n−1 is positive, that is, Y(m+2) is zero, that operation is not executed.

Figure 6:
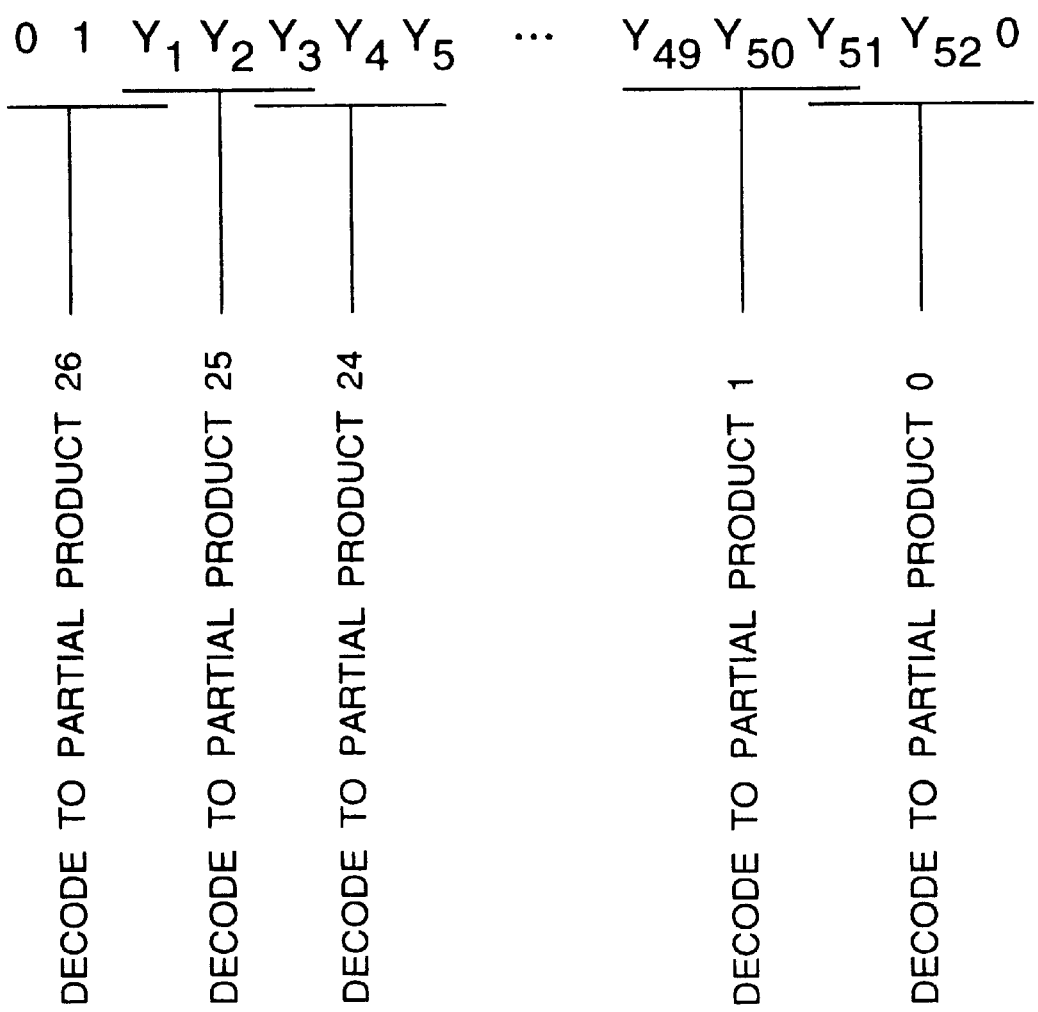
FIG. 6 is a view showing inputs to a Booth decoder.
Figure 8:
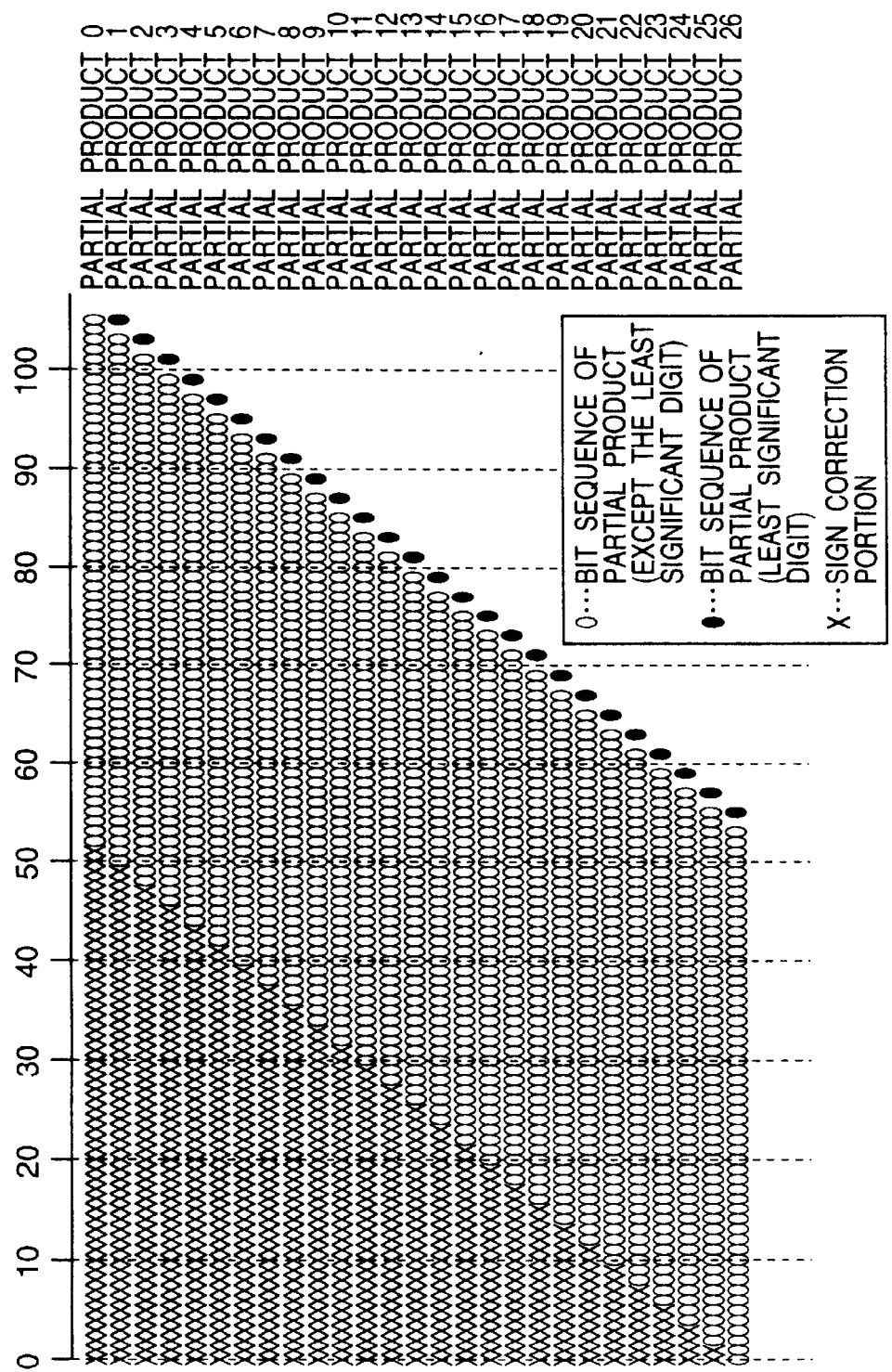
FIG. 8 is a view showing the conventional addition of partial products.
Figure 17B:
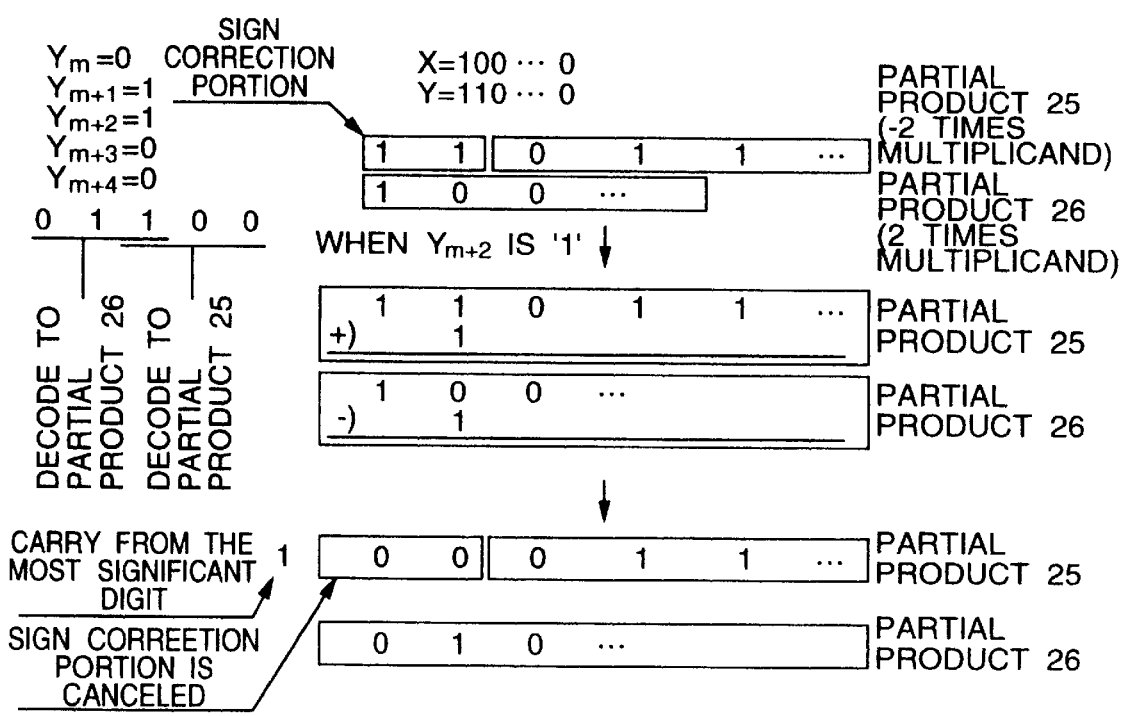

The concrete correction is shown in FIG. 17B. This correction is executed on the assumption that the multiplicand X is 1.00 . . . 0 (X(1)=X(2)=. . . =X(52)=0) and the multiplier Y is 1.100 . . . 0(Y(1)=1, Y(2)=Y(3) . . . =Y(52)=0). From the foregoing multiplier and FIG. 6, the 3-digit number to be decoded into the partial product 26 is 011 and the 3-digit number to be decoded into the partial product 25 is 100. Hence, as is understood from FIG. 7, the sort of the partial product 26 is 2 times multiplicand and the sort of the partial product 25 is −2 times multiplicand. From the above multiplicand, the bit sequence of the partial product 26 is 10.0 . . . 0, and the bit sequence of the partial product 25 is 01.1 . . . 1 and the least significant digit to be added when generating a two's complement. The substitution of these bit sequences for FIG. 7A is as follows.

Y(m)=0, Y(m+1)=1, Y(m+2)=1, Y(m+3)=0, Y(m+4)=0, n=26
P(n, 0)=1, P(n, 1)=0, P(n, 2)=0, P(n−1, 0)=0, P(n−1, 1)=1, P(n−1, 2)=1 where the most significant digit used in the addition of the partial products is that of the partial product 26, that is, the same digit as P(n, 0). Since the partial product 25 is negative, the prior art has been required to implement 2-digit sign correction up to the most significant digit used in the addition of the partial products, that is, the same digit as P(n, 0).

In this embodiment, as shown in FIG. 17A, Y(m+2) is '1'. Hence, '1' is subtracted from the digit of P(n, 1) of the partial product 26 and then the equivalent value is added to the partial product 25. This operation is executed to generate a carry on the most significant digit as well as to make the sign correction portion of the partial product 25 disappear.

Hereafter, how the sign correction portion of the negative partial product is made to disappear by the above operation with respect to the case shown in FIG. 17B as well as any other case will be described through the operations of the partial products n, n−1, and n−2 with reference to FIGS. 18 to 20. The partial product n−2 is generated by decoding Y(m+4), Y(m+5), and Y(m+6). The operation is divided into four kinds according to the values of Y(m+3) and Y(m+4). In actual, however, if Y(m+3) is zero and Y(m+4) is zero or if Y(m+3) is 1 and Y(m+4) is zero, the same operation is executed. The actual number of ways of operations is three.

Figure 18:
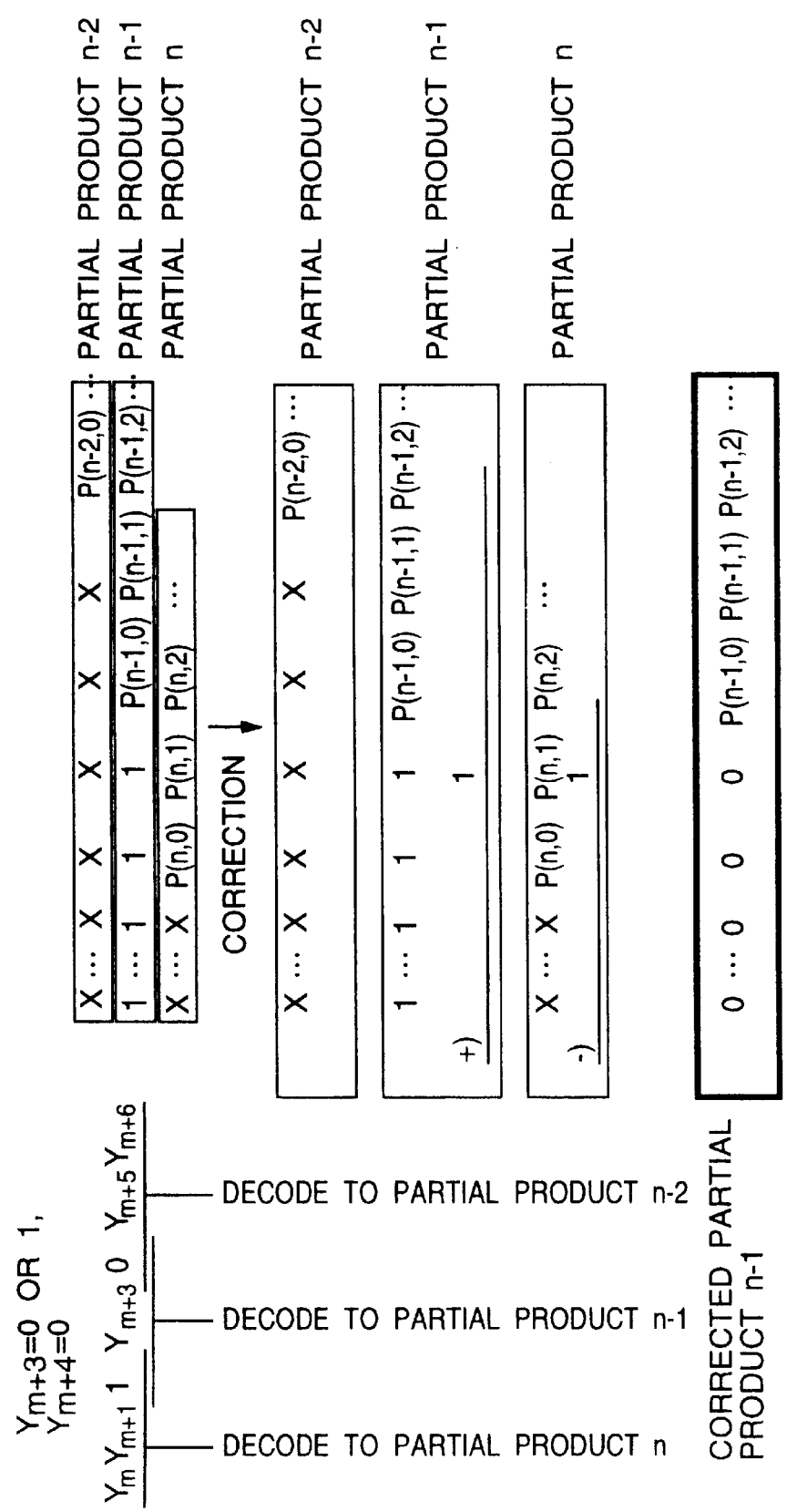
FIG. 18 is an explanatory view showing a first embodiment in which a sign correction portion is removed by correction.

At first, FIG. 18 shows the way of operation given if Y(m+3) is zero or 1 and Y(m+4) is zero. Since Y(m+2) is 1, '1' is subtracted from the digit of the P(n, 1) of the partial product n and the equivalent value is added to the partial product n−1. Since Y(m+4) is zero, the foregoing operation is not executed with respect to the partial products n−1 and n−2. As a result, the sign correction portion is made disappear in the corrected partial product n−1.

Figure 19:
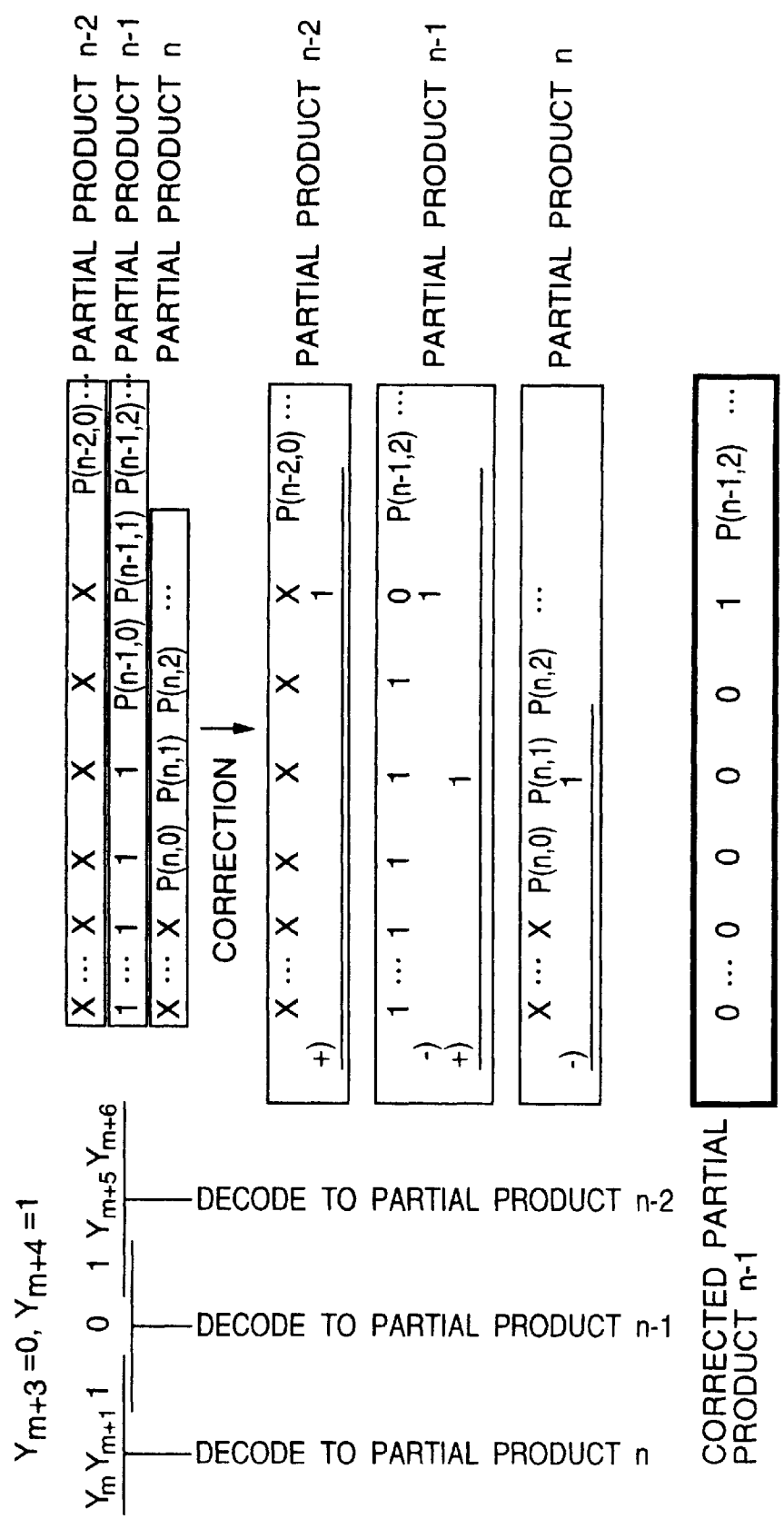
FIG. 19 is an explanatory view showing a second embodiment in which a sign correction portion is removed by correction.

Second, FIG. 19 shows the way of operation given if Y(m+3) is zero and Y(m+4) is 1. Since the partial product n−1 is −1 times multiplicand as shown in FIG. 7, P(n−1, 0)=1 and P(n−1, 1)=0. Since Y(m+2)=1, '1' is subtracted from the digit of P(n, 1) of the partial product n and the equivalent value is added to the partial product n−1. Further, since Y(m+4)=1, '1' is subtracted from the digit of P(n−1, 1) of the partial product n−1 and the equivalent value is added to the partial product n−2. This addition results in making the sign correction portion canceled from the corrected partial product n−1, thereby correcting the two high-order digits from "10" to "01".

Figure 20:
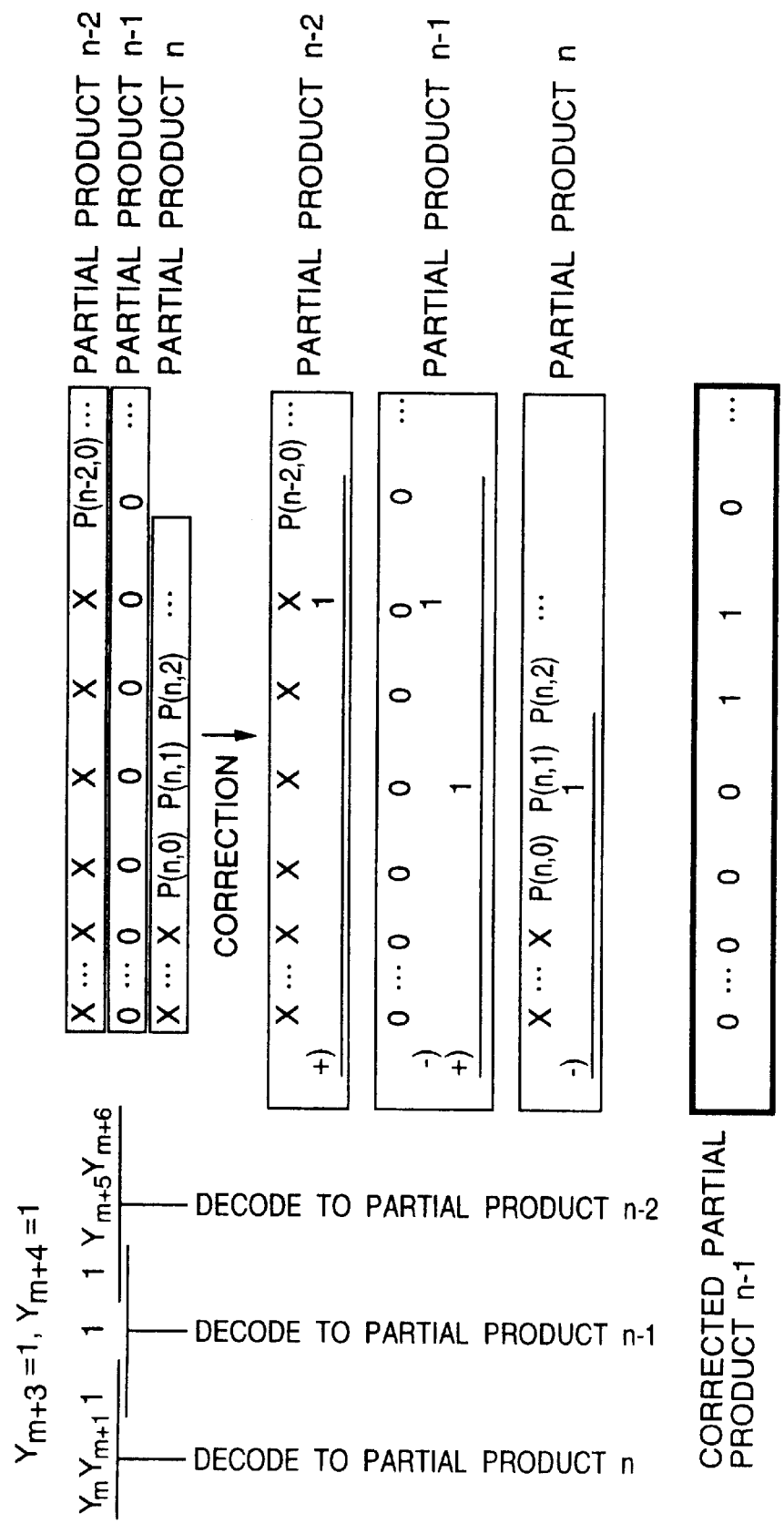
FIG. 20 is an explanatory view showing a third embodiment in which a sign correction portion is removed by correction.

Third, FIG. 20 shows the way of operation given if Y(m+3) is 1 and Y(m+4) is 1. Since the partial product n−1 is −0 times multiplicand as shown in FIG. 7, P(n−1, 0)=0 and P(n−1, 1)=0. Since Y(m+2) is 1, '1' is subtracted from the digit of P(n, 1) of the partial product n and the equivalent value is added to the partial product n−1. Further, since Y(m+4) is 1, '1' is subtracted from the digit of P(n, 1) of the partial product n−1 and the equivalent value is added to the partial product n−2. Though the partial product n−1 does not originally have any sign correction portion, this correction enables to make any sign correction portion all zeros, so the two high-order digits of the partial product are corrected from "00" to "11".

The foregoing description has indicated that the foregoing operation makes the sign correction portion disappear. That operation has an influence on the sign correction portion of the partial product n−1 and the two high-order digits of the partial product n. That operation, therefore, needs to correct the two high-order digits of the partial product n. The correcting method is shown in FIGS. 21A and 21B.

Figure 21A:
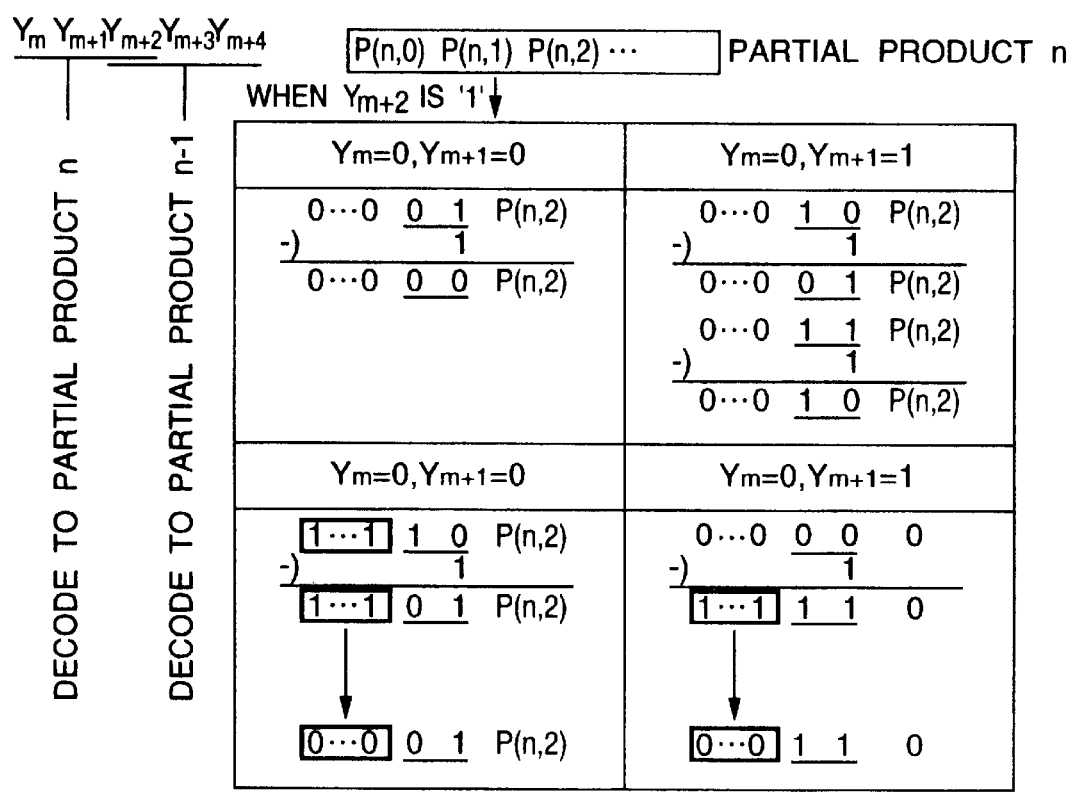
FIG. 21A is a table showing a method for correcting a partial product.

As shown in FIG. 21A, for correcting the partial product n, that is, for Y(m+2)='1', the operation is divided into four kinds according to the values of Y(m) and Y(m+1).

At first, if Y(m)=0 and Y(m+1)=0, as shown FIG. 7, the partial product is 1 times multiplicand. It means that P(n, 0)=0 and P(n, 1)=1. The foregoing operation is executed to subtract '1' from the digit of P(n, 1) of the partial product n, the result of which is P(n, 0)=0 and P(n, 1)=0.

Second, if Y(m)=0 and Y(m+1)=1, as shown in FIG. 7, the partial product is 2 times multiplicand. In this case, the operation is further divided according to the value of X(1).

(1) For X(1)=0, P(n, 0)=1 and P(n, 1)=0. The foregoing operation is executed to subtract '1' from the digit of P(n, 1) of the partial product n, the result of which is P(n, 0)=0 and P(n, 1)=1.

(2) For X(1)=1, P(n, 0)=1 and P(n, 1)=1. The foregoing operation is executed to subtract '1' from the digit of P(n, 1) of the partial product n, the result of which is P(n, 0)=1 and P(n, 1)=0.

Third, if Y(m)=1 and Y(m+1)=0, as shown in FIG. 7, the partial product is −1 times multiplicand. It means that P(n, 0)=1 and P(n, 1)=0. Further, since the partial product is negative, it needs the sign correction. The foregoing operation is executed to subtract '1' from the digit of P(n, 1) of the partial product n, the result of which is $\overline{P(n, 0)}=0$ and $\overline{P(n, 1)}=1$. The foregoing operation with the partial product n+1 makes the sign correction portion disappear. The partial product in this case corresponds to the partial product n−1 shown in FIG. 19.

Fourth, if Y(m)=1 and Y(m+1)=1, as shown in FIG. 7, the partial product is −0 times multiplicand. It means that P(n, 0)=0 and P(n, 1)=0. The foregoing operation is executed to subtract '1' from the digit of P(n, 1) of the partial product n, the result of which is P(n, 0)=1 and P(n, 1)=1. This result gives rise to the sign correction portion. However, the foregoing operation with the partial product n+1 makes the sign correction portion disappear. The partial product n in this case corresponds to the partial product n−1 shown in FIG. 20.

From the aforementioned results, assuming that the corrected P(n, 0) is R(n, 0) and the corrected P(n, 1) is R(n, 1), R(n, 0) and R(n, 1) are expressed by the expression 6.

(1) $R(n,0) = \overline{P(n,0) \oplus P(n,1)}$ (2) $R(n,1) = \overline{P(n,1)}$     (expression 6)

The relation between the inputs Y(m), Y(m+1) and Y(m+2) and R(n, 0) and R(n, 1) is as follows.

(a) If Y(m+2)=0 (about P0 and P1, see FIG. 7),
   R(n, 0)=(P0)
   R(n, 1)=(P1)
(b) If Y(m+2)=1, (about P0 and P1, see FIG. 7)
   R(n, 0)=$\overline{P}$ 0 ⊕ P1
   R(n, 1)=$\overline{P}$ 1

The above-mentioned relation is shown in FIG. 21B.

The partial product corrector 104 shown in FIG. 16 is a circuit for outputting the two high-order digits of the corrected partial product. X(1) is a next digit to an implicit 1 digit of the multiplicand X, and Y(1), Y(2), . . . Y(52) are multipliers arranged in order of weight. R(0, 0) is the most significant digit of the corrected partial product 0 and R(0, 1) is the second most significant digit thereof. R(1, 0) is the most significant digit of the partial product 1 and R(1, 1) is the second most significant digit thereof. R(26, 0) is the most significant digit of the corrected partial product 26 and R(26, 1) is the second most significant digit thereof.

R(n, 0) (0≦n≦26) is obtained as follows. As is understood from the relation between the inputs and the corrected two digits as shown in FIG. 21B, the following case (1) or (2) meets the condition that R(n, 0) is 1.

(1) Y(m+1)=1 and Y(m+2)=1 and X(1)=1
(2) Y(m)=1 and Y(m+1)=1

R(n, 0) (0≦n≦26) shown in FIG. 16 is a logical OR of the cases (1) and (2).

R(n, 1) (0≦n≦26) is obtained as follows. From the relation between the inputs and the corrected two digits as shown in FIG. 21B, the following cases (1), (2) and (3) meet the condition that R(i, 1) is 1.

(1) Y(m)=1 and Y(m+2)=1
(2) Y(m)=0 and Y(m+1)=1 and Y(m+2)=0
(3) Y(m) ⊕ Y(m+1)=1 and X(1)=0

R(n, 1) (0≦n≦26) shown in FIG. 16 is a logical OR of the cases (1), (2) and (3).

Figure 1:
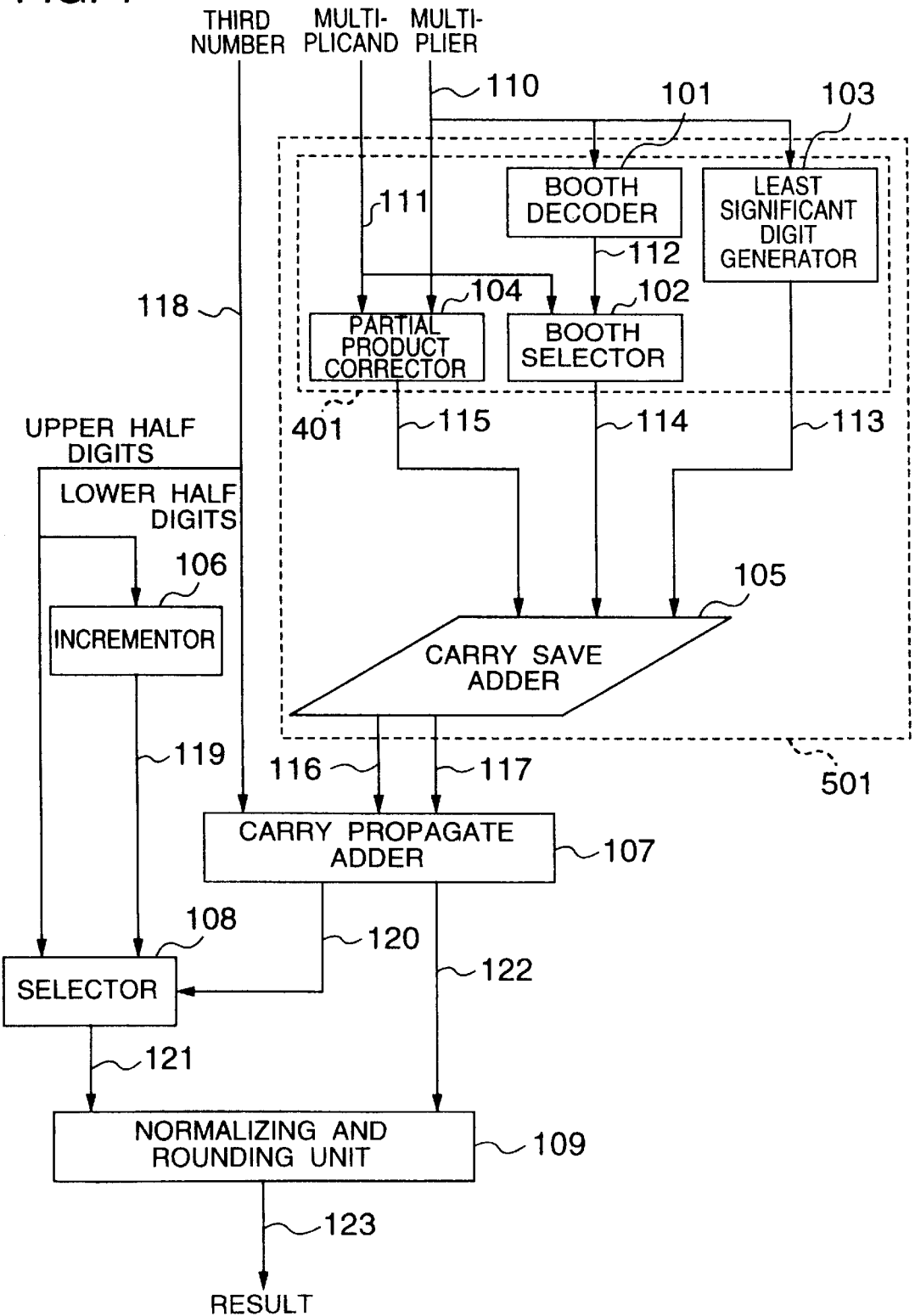
FIG. 1 is a block diagram showing an arrangement of a floating point operating apparatus for a sum of products according to the present invention.

FIG. 1 shows an arrangement of a floating point operating apparatus for a sum of products that utilizes the foregoing addition of partial products according to the present invention. Of the components shown in FIG. 1, the Booth decoder 101, the Booth selector 102, the least significant digit generator 103, the partial product corrector 104, and the carry save adder 105 are the same as those described above.

Figure 9:
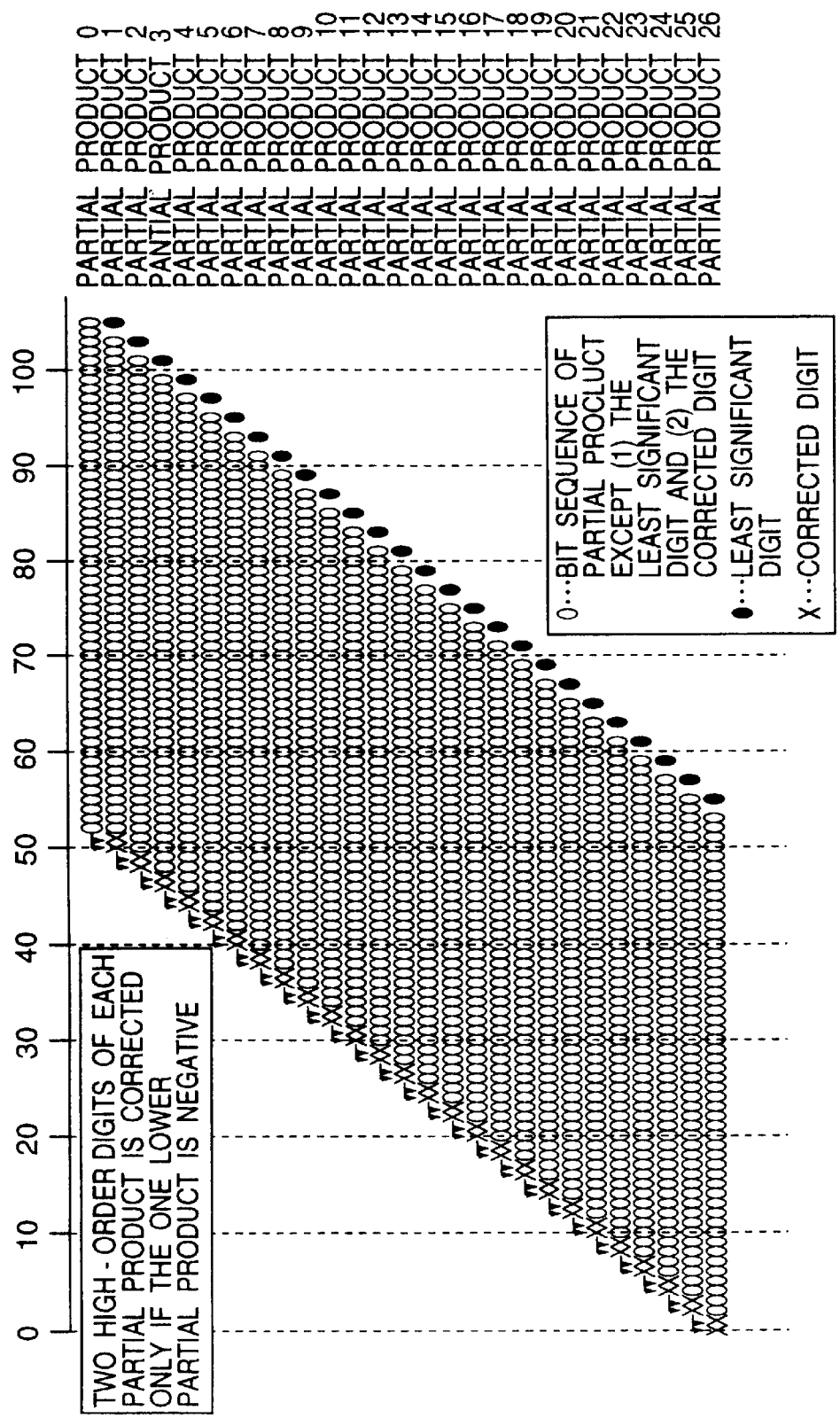
FIG. 9 is a view showing an addition of partial products according to the present invention.
Figure 10:
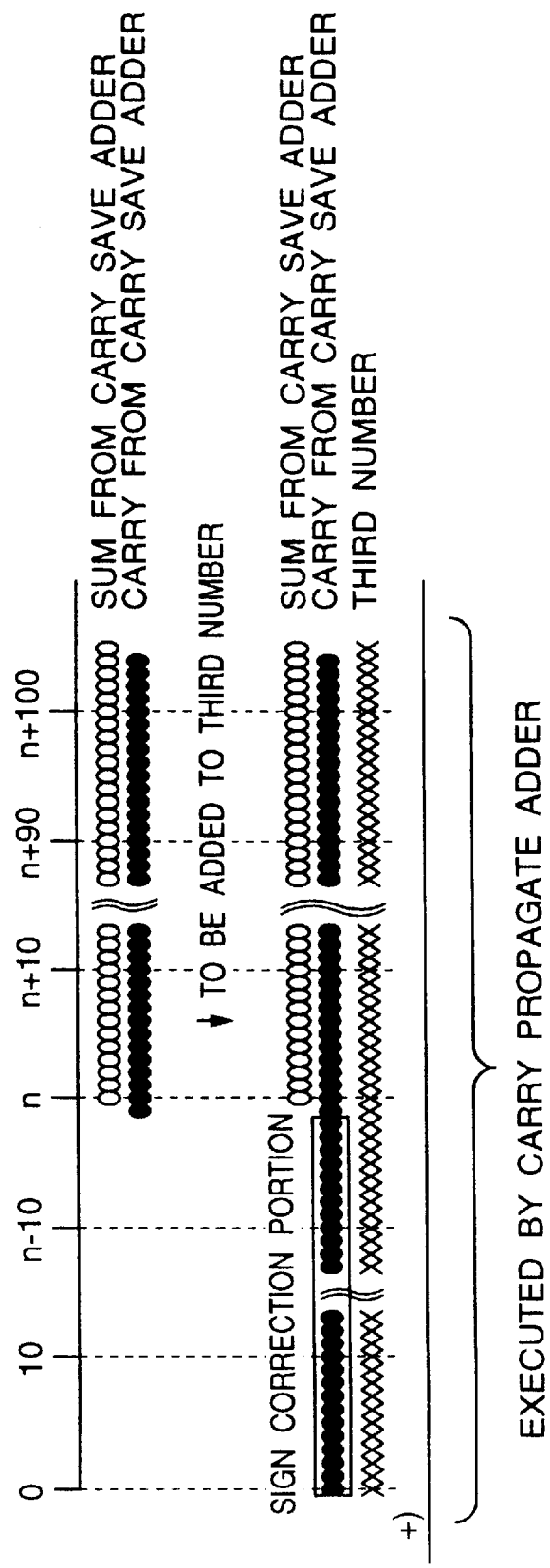
FIG. 10 is a view showing a carry propagate addition executed in the conventional sum of products.
Figure 11:
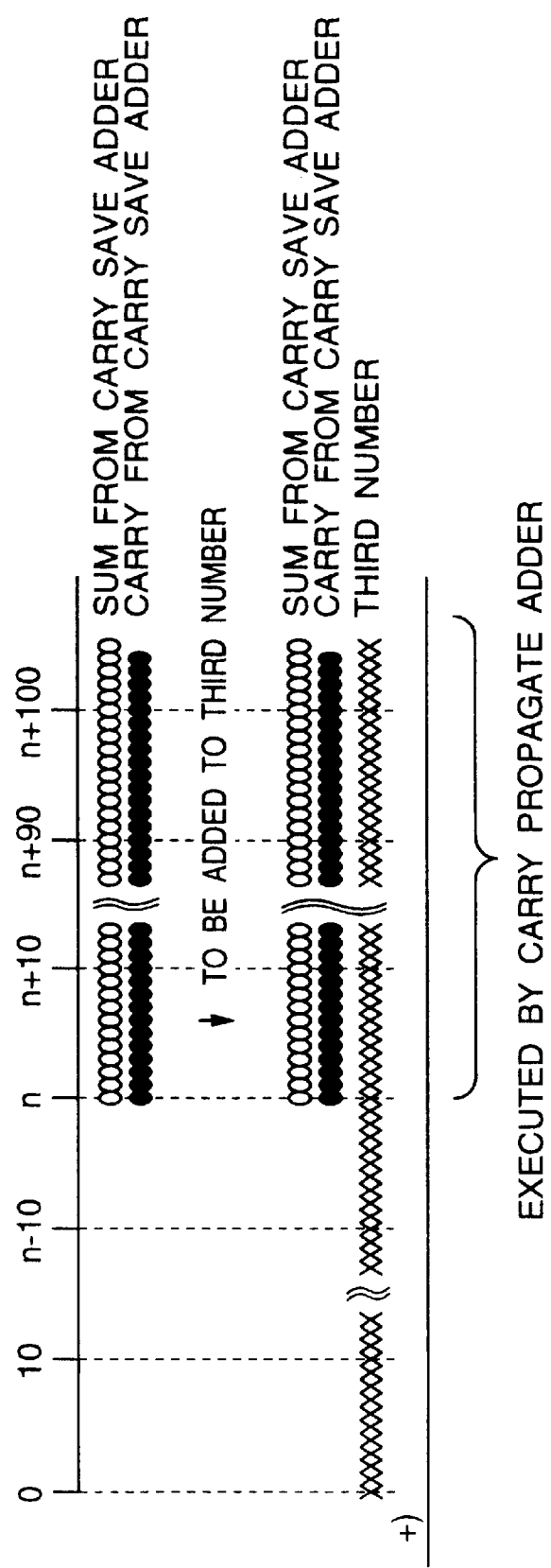
FIG. 11 is a view showing a carry propagate addition executed in the sum of product operation according to the present invention.

The carry save adder 105 is served to add the digits of the same weight in the list of the partial products. Concretely, the adder 105 operates to add a signal 113 for representing the least significant digit to be added when generating a two's complement, a signal 114 for representing the digits except two high-order digits contained in the partial product, and a signal 115 for representing the corrected two high-order digits of the partial product. In the list of the partial products sho in FIG. 9, no sign correction portion is provided. Accordingly, as shown in FIG. 11, just one carry is generated from the digits equal to and upper than the most significant digit of the carry save adder. Hence, in a case that the third number is added to the partial products, for the purpose of calculating the digits that exceed the most significant digit of the carry save adder, it is not necessary to use the carry propagate adder that contains a large amount of hardware and number of paths for the digits that exceed the most significant digit of the carry save adder.

In the arrangement shown in FIG. 1, the multiplying unit for a sum of products is implemented by an incrementor 106, a carry propagate adder 107, and a selector 108. The incrementor 106 generates a signal 119 for representing one plus the digits upper than the most significant digit of the carry save adder of the third number 118.

The carry propagate adder 107 performs a carry propagate addition with respect to the signals 116, 117 and the digits equal to and lower than the most significant digit of the carry save adder of the third number 118 for generating a carry signal 120 from the most significant digit and a resulting signal 122 of the lower digits. The selector 108 selects the signal 119 or the digits upper than the most significant digit of the carry save adder of the third number 118 in response to the signal 120 and outputs a resulting signal 121 on the upper digit. A normalizing and rounding unit 109 operates to normalize and round the signals 121 and 122 and outputs a resulting signal 123 of the operating apparatus for a sum of products.

Figure 2:
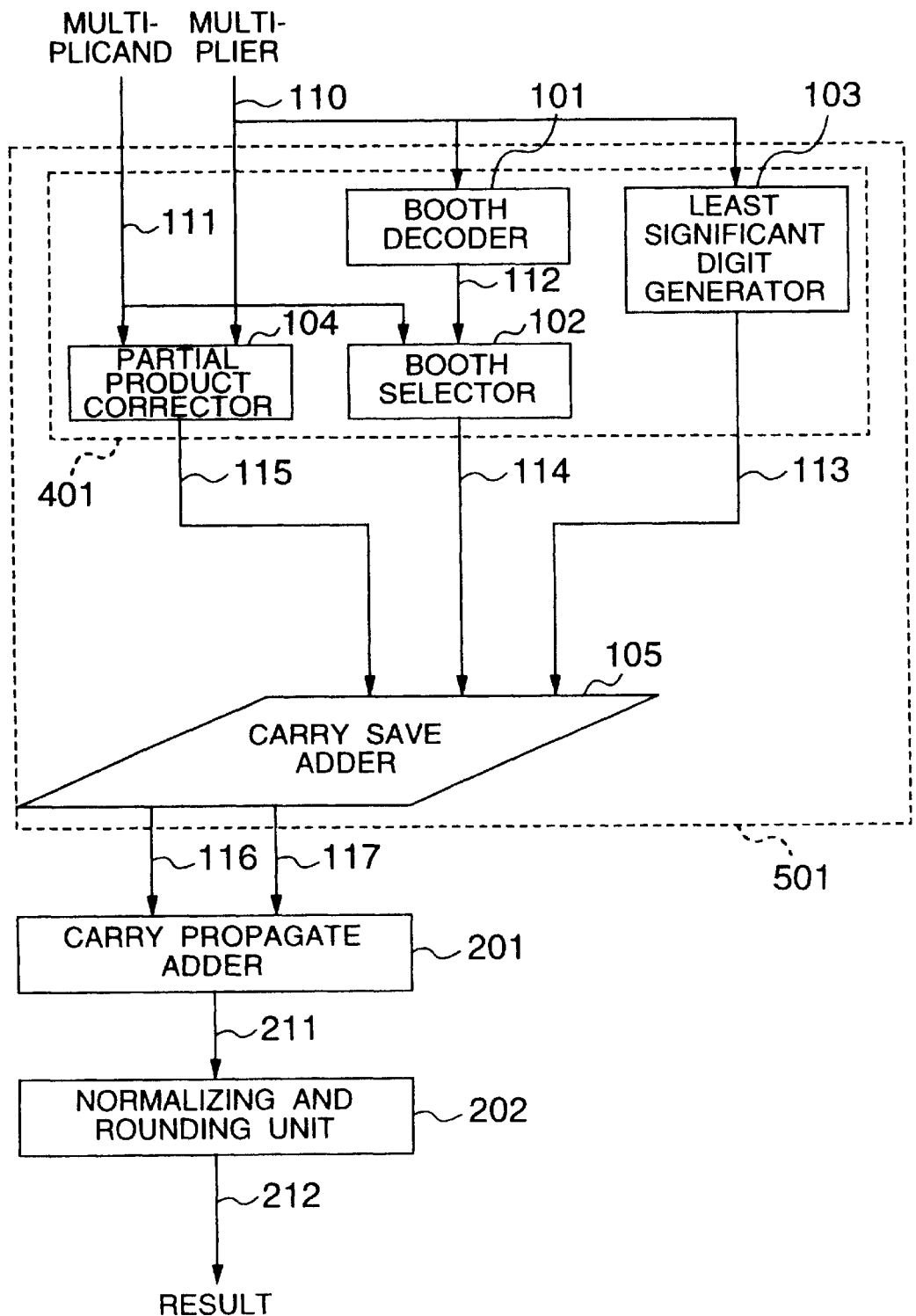
FIG. 2 is a block diagram showing an arrangement of a floating point multiplying apparatus according to the present invention.

FIG. 2 shows an arrangement of the floating point multiplying apparatus that utilizes the foregoing addition of partial products according to the present invention. Of the components shown in FIG. 2, the Booth decoder 101, the Booth selector 102, the least significant digit generator, the partial product corrector 104, and the carry save adder 105 are the same as those described above. The carry propagate adder 201 performs a carry propagate addition on the signals 116 and 117 and outputs a signal 211. A normalizing and rounding unit 202 operates to normalize and round the signal 211 and outputs a resulting signal 212 of the multiplying apparatus.

This partial product adding apparatus and method may be applied to the floating point multiplication as well as the multiplication of integers. Or, it may apply to the floating point multiplication at the format except the ANSI/IEEE Std '754.

(II) Matching the Most Significant Digits to the Same Position

Figure 4:
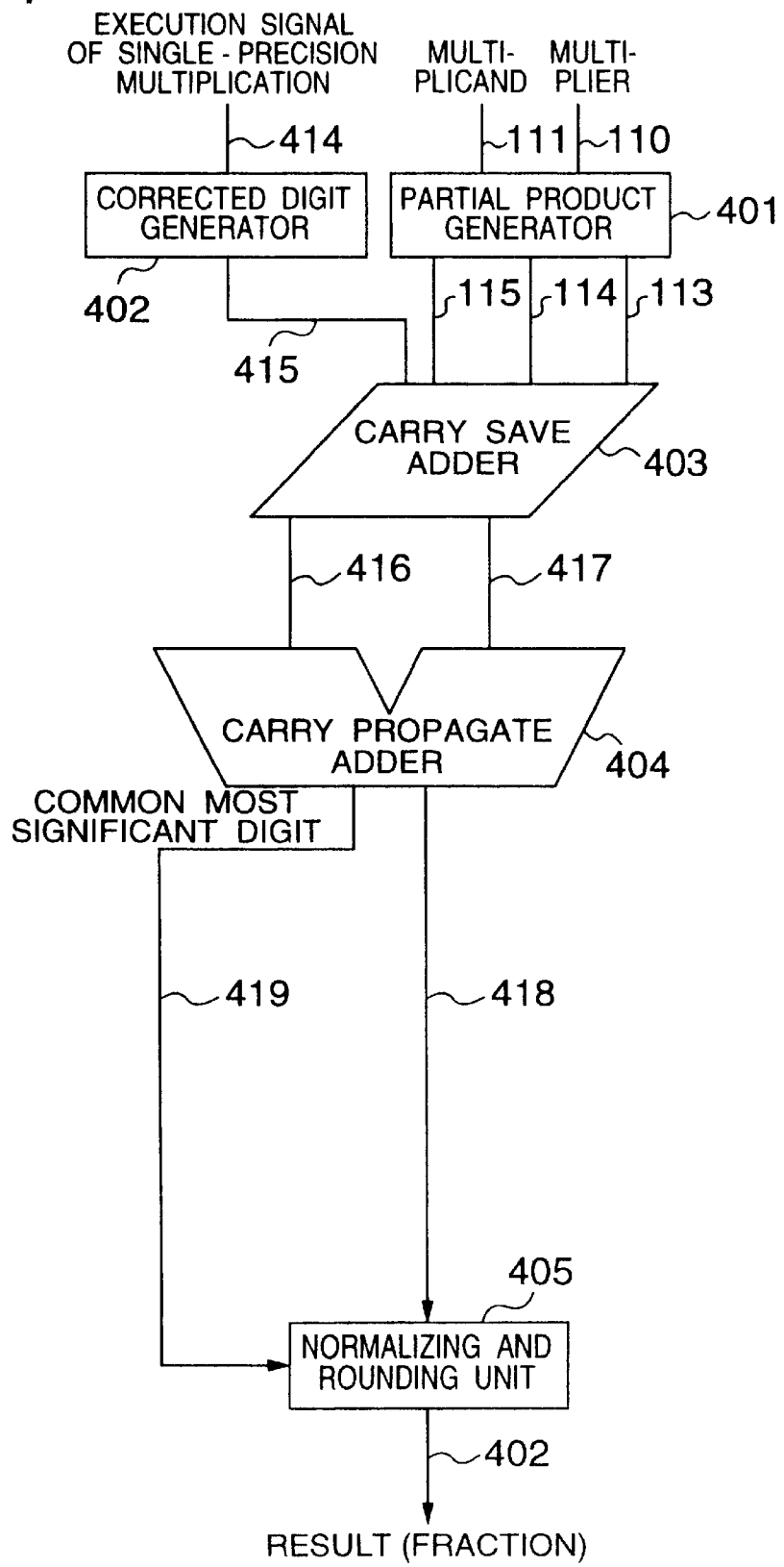
FIG. 4 is a block diagram showing an arrangement of a floating point multiplying apparatus for detecting the most significant digit according to the present invention.

FIG. 4 shows an arrangement of the floating point multiplying apparatus for matching the most significant digits to the same position according to the present invention. At first, the description will be oriented to the method for matching the most significant digits to the same position between the single-precision operation and the double-precision operation with reference to FIGS. 22A and 22B.

FIG. 22A shows the addition of partial products about the double-precision multiplicand X (1.X1 X2.... X52) and the double-precision multiplier Y (1.Y1 Y2 ... Y52). Xi and Yj are 1 or 0. Herein, the partial product of X and Y1 is assumed to be A01, A11, ..., A511, A521, ... and the partial product of X and Y52 is assumed to be A052, A152, ..., A5152, A5252.

Since the multiplicand or the multiplier consists of 53 digits, the added result of the partial products may have up to 106 digits. This result is assumed to be M(MV, M0.M1 ... M104). The multiplicand and the multiplier are both normalized numbers, the 53rd digit of the number counted from the least significant digit is 1. Hence, at the 105th or 106th digit of the added result counted from the least significant digit, a value of 1 is located. That is, the possible most significant digit is M0 at the 105th digit counted from the least significant digit or MV at the 106th digit counted therefrom. Further, the position (termed a rounding position) at which 1 may be added according to a rounding mode is lower by 52 digits than the most significant digit. It means that the rounding position is M52 when the most significant digit is at M0 or M51 when it is at MV.

The rounding position for multiplying the multiplicand X by the multiplier Y at the single-precision mode is matched to the rounding position at the double-precision mode. That is, in order for the rounding positions for both modes to be M52 or M51, it is necessary to align the most significant digit of X at the single-precision mode to the same digit at the double-precision mode and the least significant digit of Y at the single-precision mode to the same digit at the double-precision mode. This method is shown in FIG. 22B.

Partial product of X and Y1 is A01, A11, ..., A221, A231, ...

Partial product of X and Y23 is A023, A123, ..., A2223, A2323.

In this case, since the multiplicand consists of 53 digits and the multiplier consists of 24 digits, the added result of the partial products may have up to 77 digits. Assuming that the least significant digit is M104 as shown in FIG. 22A, the added result of the partial products is M(M28 M29 ... M104). The multiplicand contains a value of 1 at the 53rd digit counted from the least significant digit, while the multiplier contains a value of 1 at the 24th digit counted from the least significant digit. The added result of partial products contains a value of 1 at the 76th or 77th digit counted from the least significant digit. That is, the possible most significant digit is M29 at the 76th digit counted from the least significant digit or M28 at the 77th digit counted therefrom. The rounding position is lower by 23 digits than the most significant digit. It is M52 when the most significant digit is M29 or M51 when it is M28.

Figure 35:
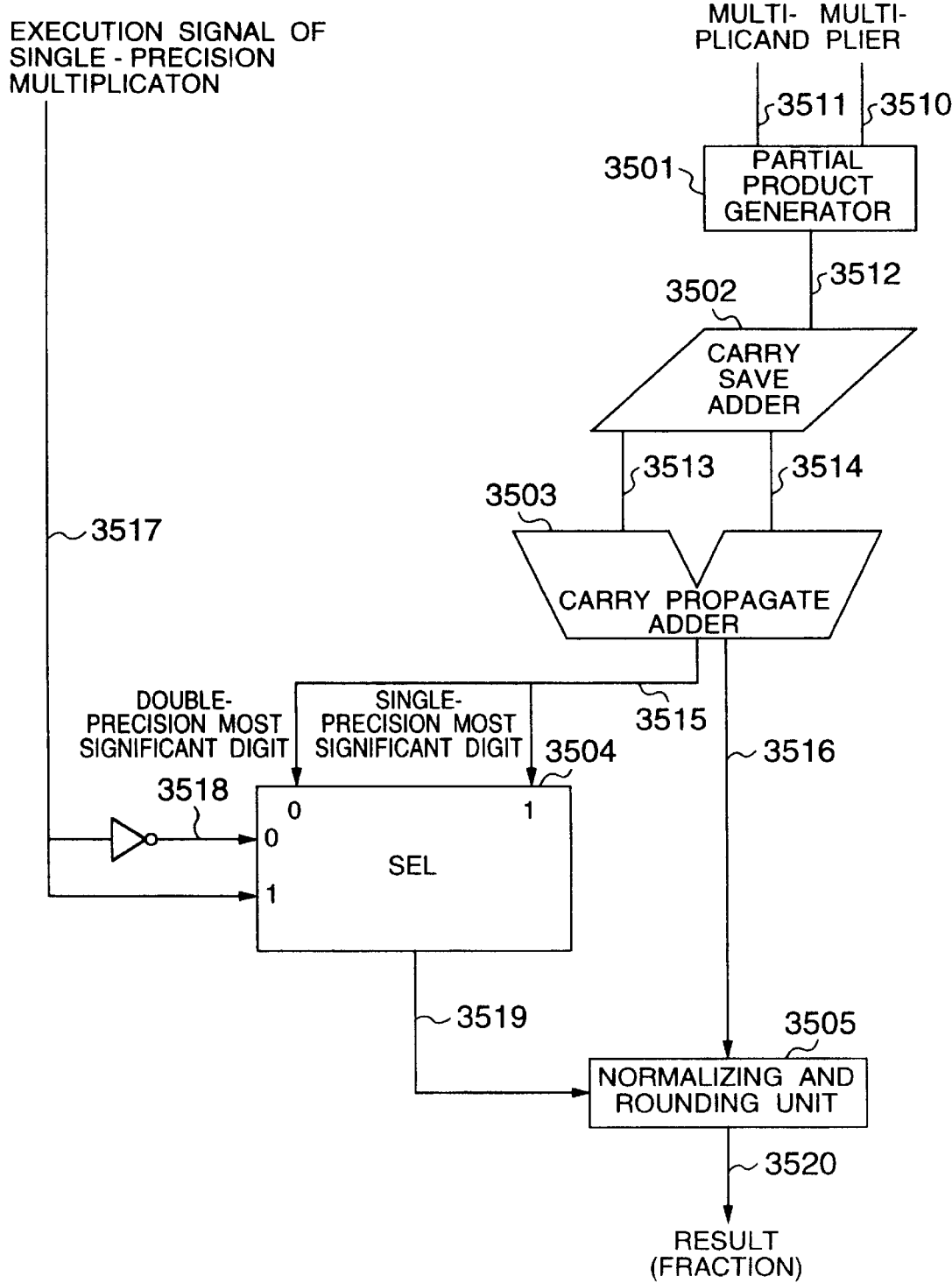
FIG. 35 is a block diagram showing an arrangement of a floating point multiplying apparatus according to another prior art.
Figure 36:
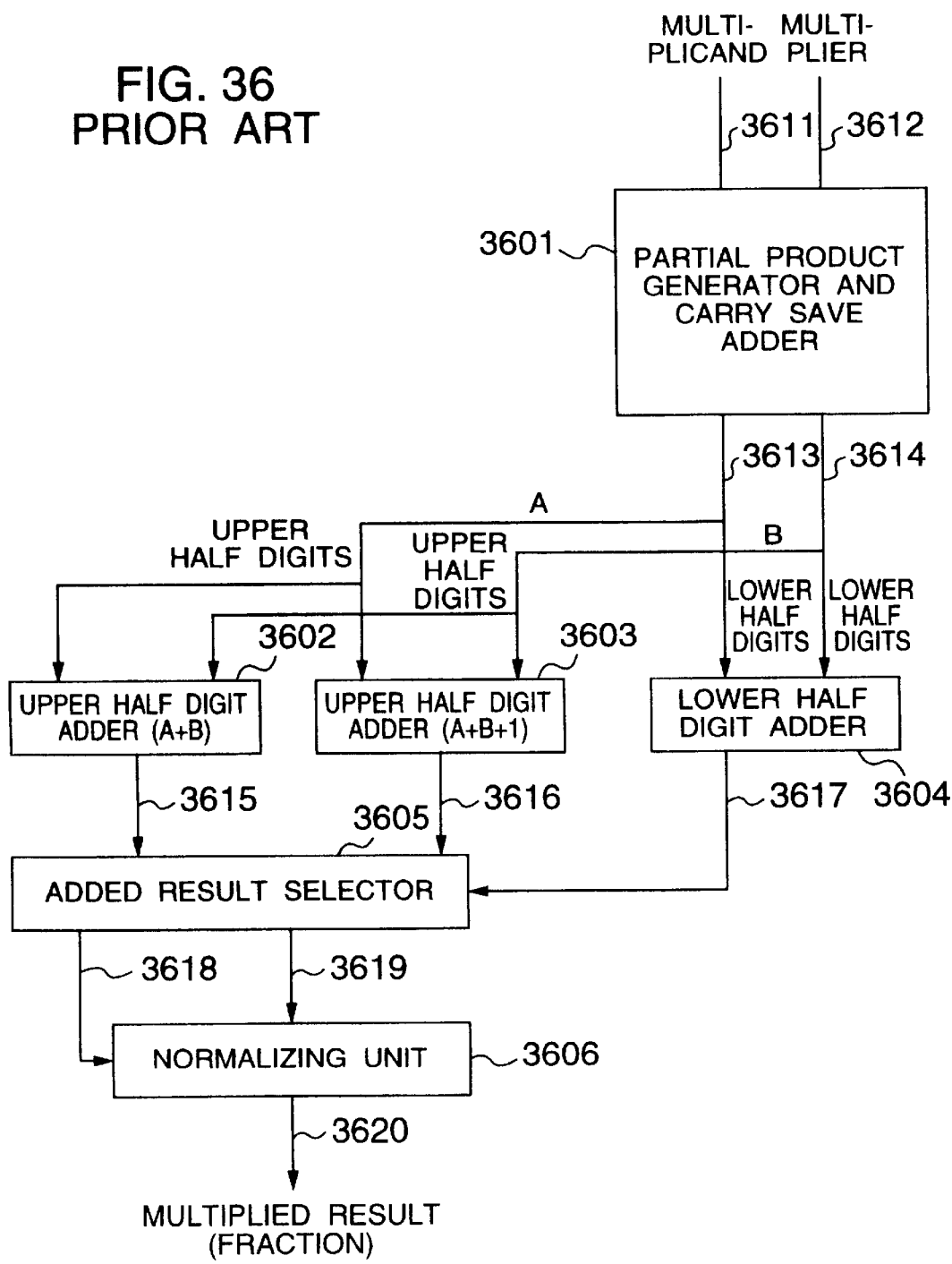
FIG. 36 is a block diagram showing an arrangement of a floating point multiplying apparatus according to another prior art.

The implementation of the foregoing method results in matching the rounding position for the single-precision to that for the double-precision but mismatching the most significant digit for the single-precision to that for the double-precision. Like the prior art shown in FIG. 35, therefore, it is necessary to provide a circuit for selecting the most significant digit for the double-precision or for the single-precision.

Herein, when adding the partial products during execution of the single-precision operation, correction digits, corresponding to 29 digits from M0 to M28 and consisting of 29 bits of '1', are added. As shown in FIG. 22C, when the original single-precision most significant digit is M29, the most significant digit is moved to M0 by the correction. When the original single-precision most significant digit is M28, the most significant digit is moved to MV by the correction and the propagation of carry from M28 to MV. That is, by adding the correction digits, the rounding position as well as the most significant digit are matched to the same positions both between the single-precision mode and the double-precision mode. In the matching state, the digits are normalized and rounded and then the upper 29 bits are removed.

In this embodiment, the addition of the correction digits is executed inside the carry save adder. In actual, the location where the correction digits are added may be any where including the carry save adder. FIG. 22D shows the correction digit generator 402. Each bit 415 of the correction digit is created from a signal 414 for representing the execution of the single-precision operation.

In FIG. 4, a numeral 401 denotes a partial product generator, which serves to generate the signals 113, 114 and 115 (all of which are the same as those shown in FIG. 1) from the 111 and the 110. The arrangement of this embodiment uses the partial product generator shown in FIG. 1. In place, it may take another kind of partial product generator. The carry save adder 403 performs a carry save addition of the signals 113, 114, 115 and the correction digits 415 and outputs two output signals, sum 416 and carry 417.

Figure 23:
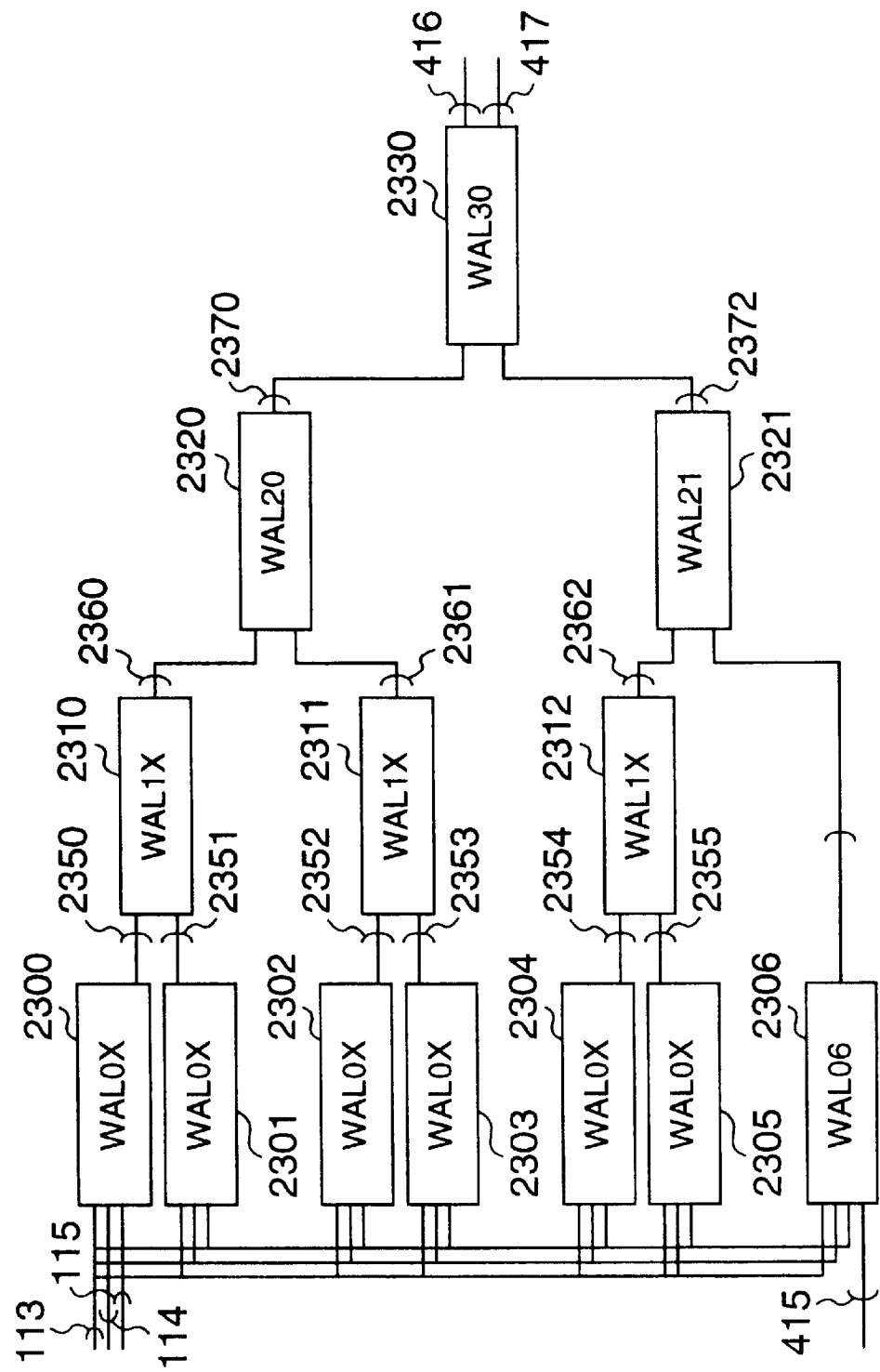
FIG. 23 is a block diagram showing an overall arrangement of a carry save adder.

The arrangement of the carry save adder is shown in FIG. 23. In this embodiment, the carry save adder uses a four-stage Wallace Tree but may use another arrangement. The signal 113 is the least significant digit to be added when generating a two's complement, which digit is generated by the least significant digit generator 103 in FIG. 15. The signal 114 is the partial product P(i, j) ($0 \leq i \leq 26$, $2 \leq j \leq 53$) generated by the Booth Selector 102 in FIG. 13. The signal 115 is the partial product R(i, j) ($0 \leq i \leq 26$, $0 \leq j \leq 1$) generated by the partial product corrector 104 in FIG. 16. The signals 416 and 417 are derived as a result of the carry save addition.

In FIG. 23, each of adders 2300, 2301, 2302, 2303, 2304, 2305, 2306, 2310, 2311, 2312, 2320, 2321, and 2330 is composed of a full adder. In place, the adder may take another adding means. The details will be described with reference to FIGS. 24 and 29.

Figure 24:
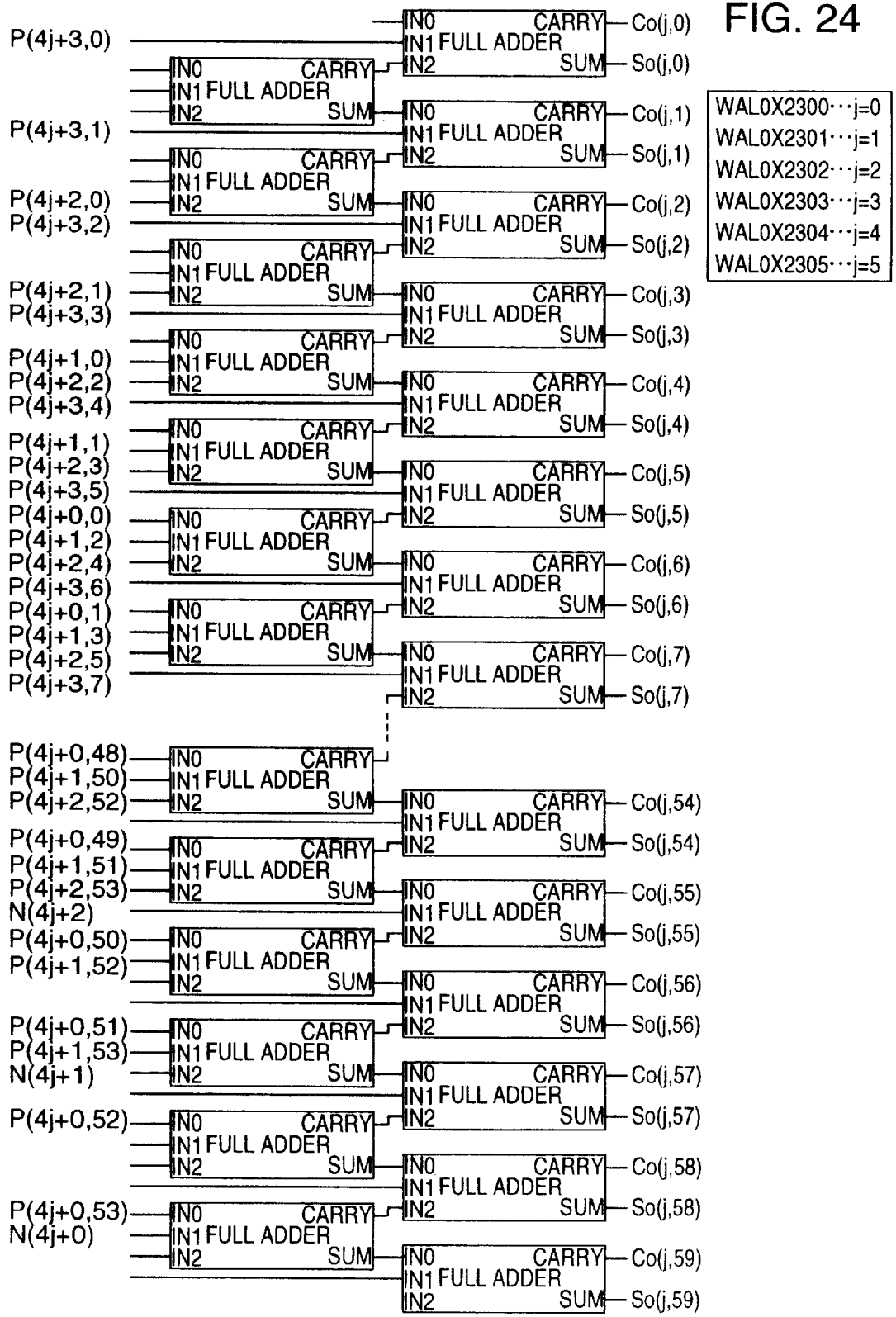
FIG. 24 is a block diagram showing an arrangement of a first-stage adder composing the carry save adder.

Of the adders 2300, 2301, 2302, 2303, 2304, 2305, and 2306, six adders except 2306 have the same internal circuitry except their I/O signals. The details are shown in FIG. 24. The adder 2300 corresponds to the case j=0, the adder 2301 corresponds to the case for j=1, . . . , the adder 2305 corresponds to the case j=5, and so forth.

The signals Cx and Sx denote a carry and a sum at the (x+1)th stage.

Figure 25:
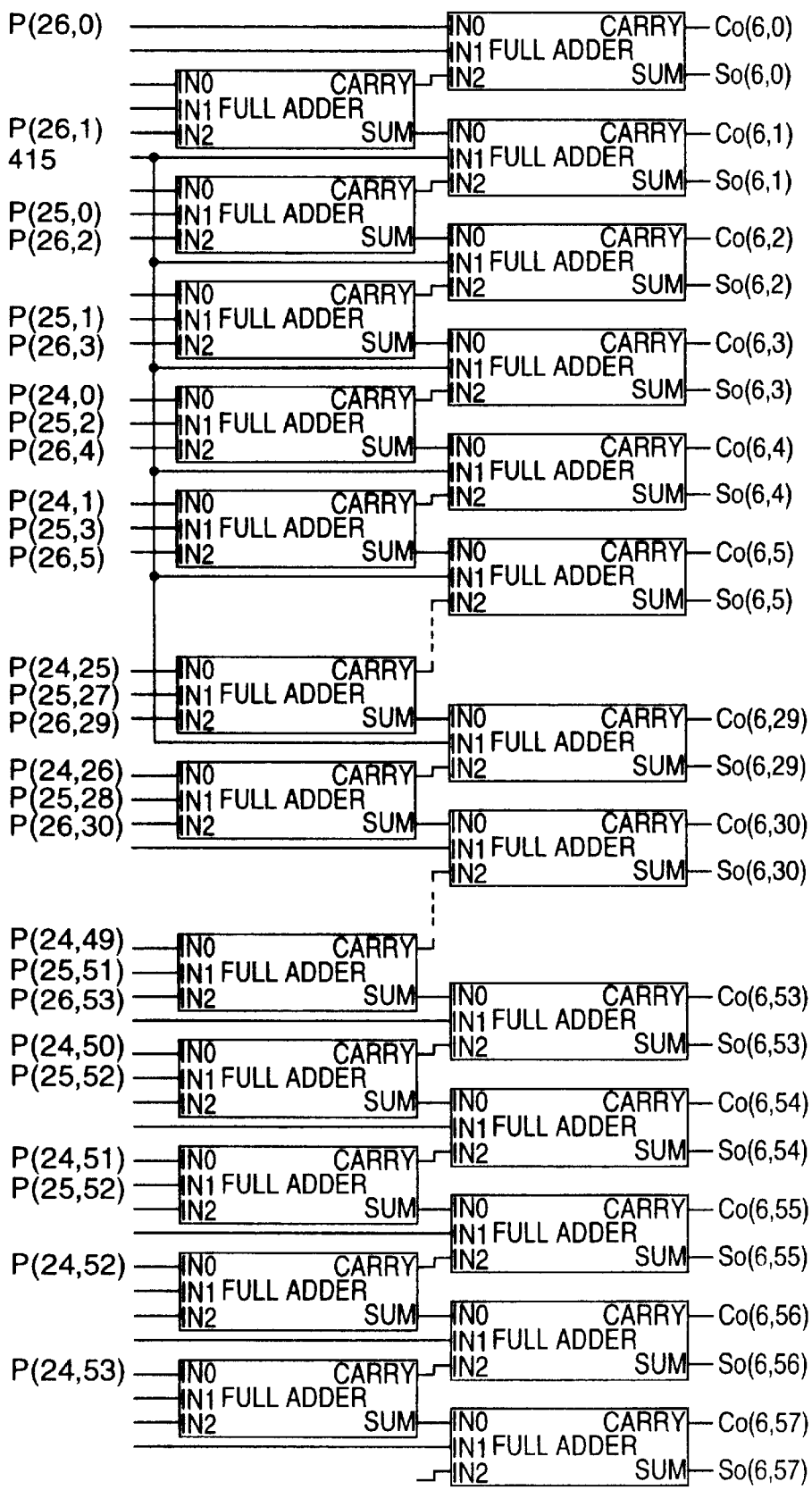
FIG. 25 is a block diagram showing an arrangement of a first-stage adder composing the carry save adder.
Figure 26:
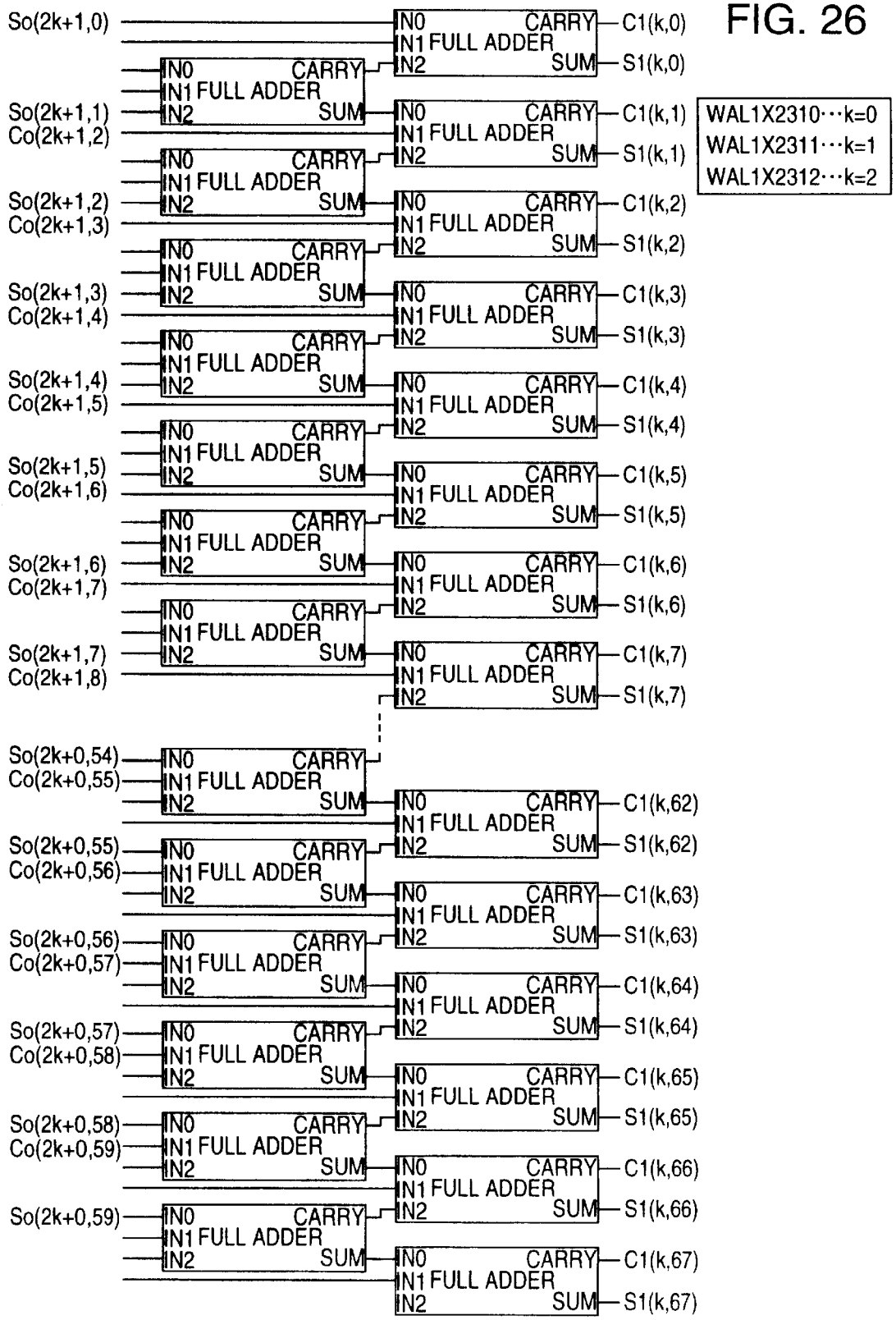
FIG. 26 is a block diagram showing an arrangement of a second-stage adder composing the carry save adder.
Figure 27:
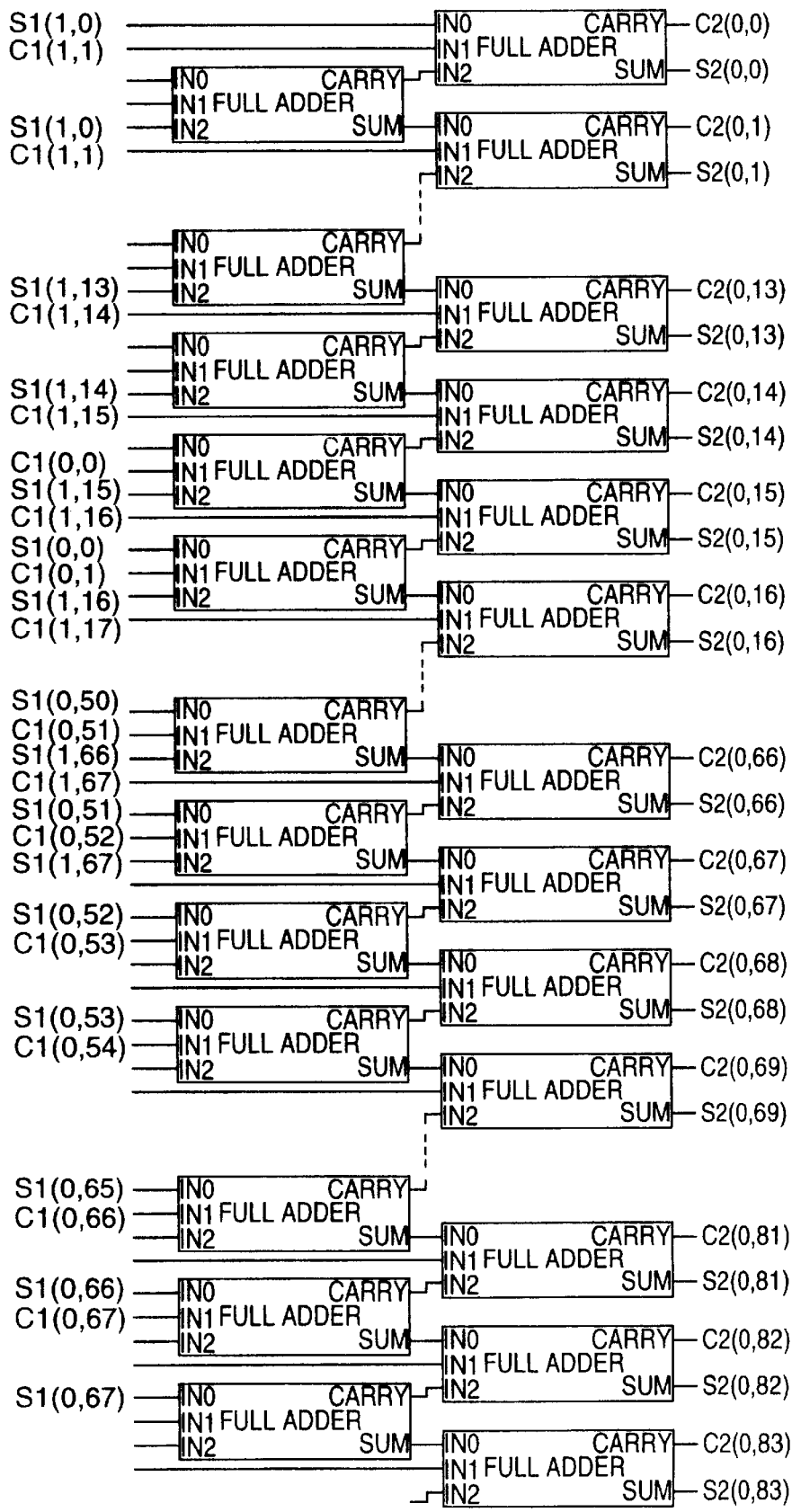
FIG. 27 is a block diagram showing an arrangement of a third-stage adder composing the carry save adder.
Figure 28:
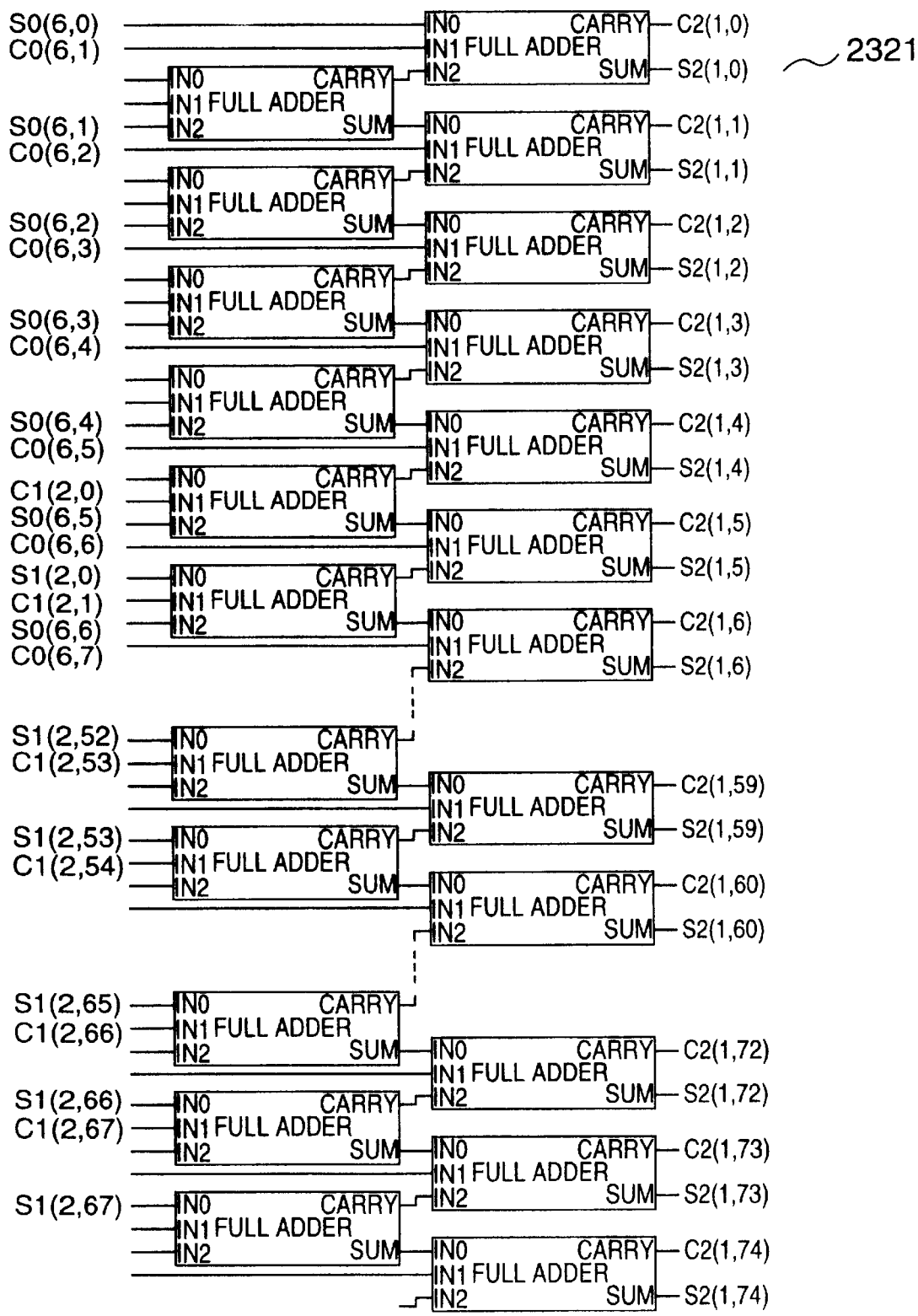
FIG. 28 is a block diagram showing an arrangement of a third-stage adder composing the carry save adder.
Figure 29:
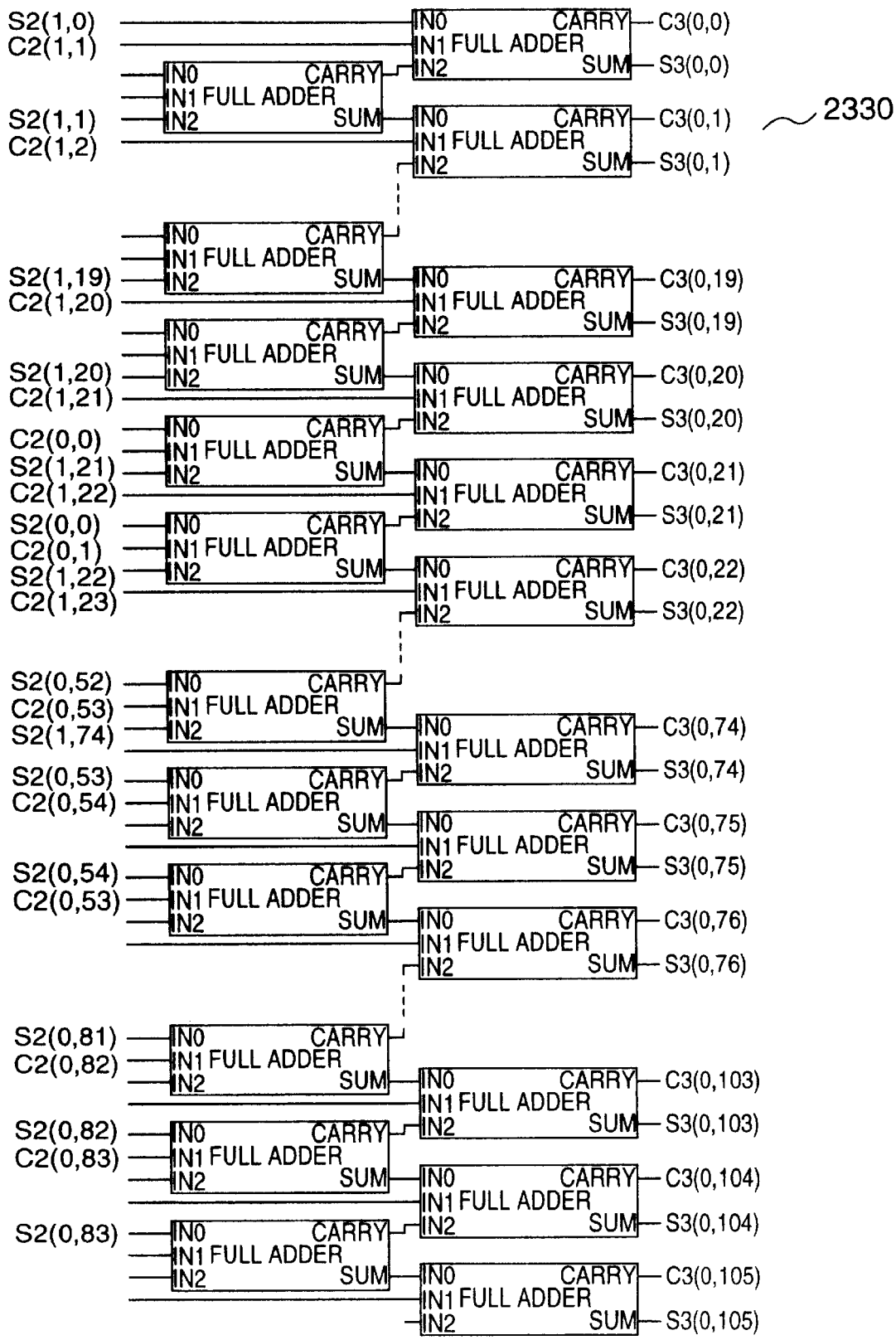
FIG. 29 is a block diagram showing an arrangement of a fourth-stage adder composing the carry save adder.

The details of the adder 2306 at the first stage are shown in FIG. 25. In FIG. 25, a signal 415 represents correction digits to be added in the addition of partial products for matching the most significant digit for the single-precision to that for the double-precision. Each of the adders 2310, 2311, and 2312 at the second stage has the same internal circuitry except their I/O signals. The details will be shown in FIG. 26. The adder 2310 corresponds to the case k=0, the adder 2311 corresponds to the case k=1, and the adder 2312 corresponds to the case k=2. The details of the adder 2320 at the third stage are shown in FIG. 27. Likewise, the adder 2321 at the third stage is shown in FIG. 28. The details of the adder 2330 at the fourth stage are shown in FIG. 29.

Turning to FIG. 4 again, the carry propagate adder 404 performs a carry propagate addition of the signals 416 and 417 and generates an additional signal 418 and the most significant digit 419. The normalizing and rounding unit 405 operates to normalize and round the additional signal 418 and the most significant digit 419 10 and outputs the resulting (fractional) signal 420 of the floating point multiplying apparatus.

(III) Normalizing Shift

Figure 5A:
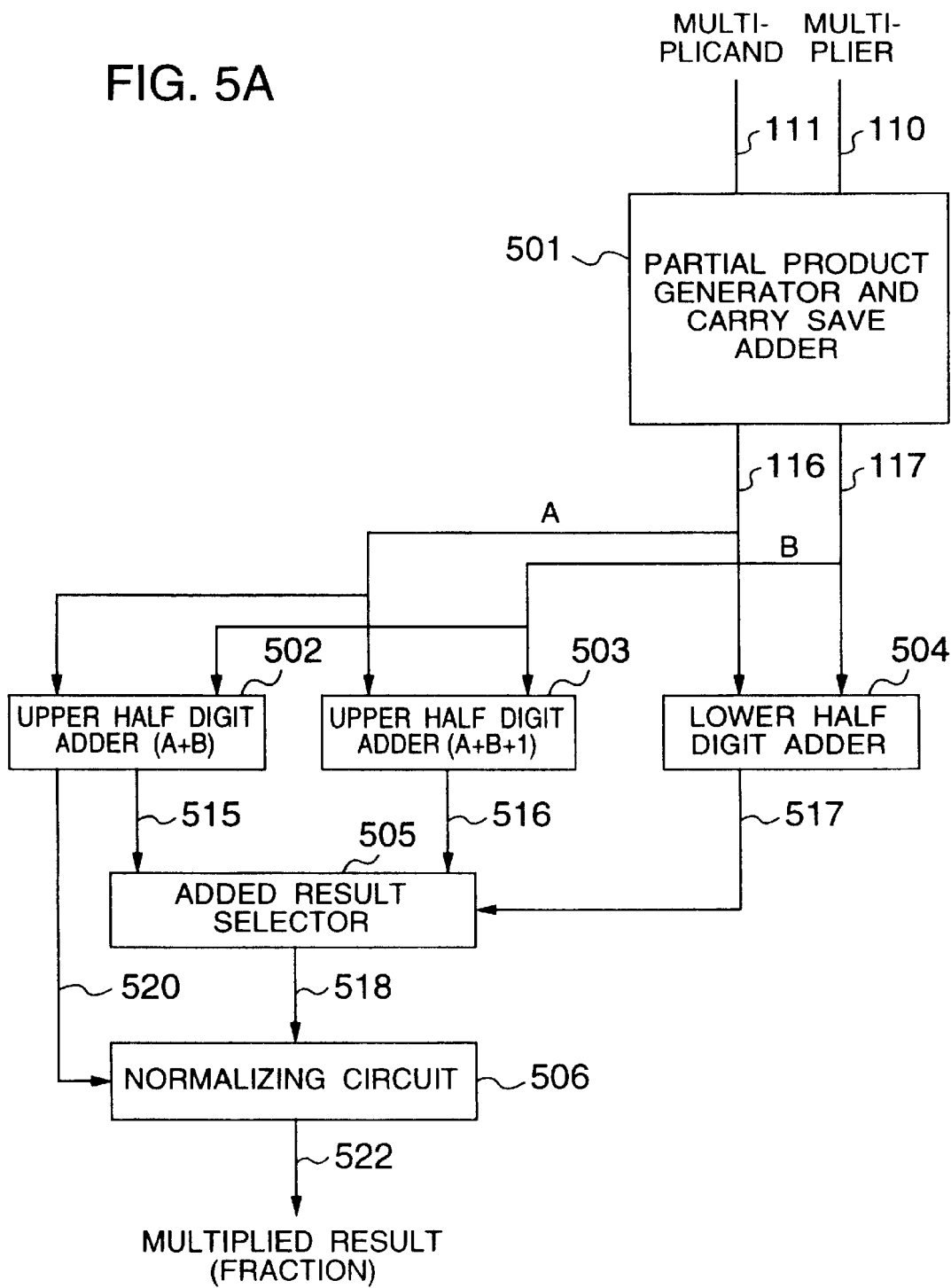
FIGS. 5A and 5B are block diagrams showing an arrangement of a floating point multiplying apparatus for performing a normalizing shift according to the present invention.
Figure 5B:
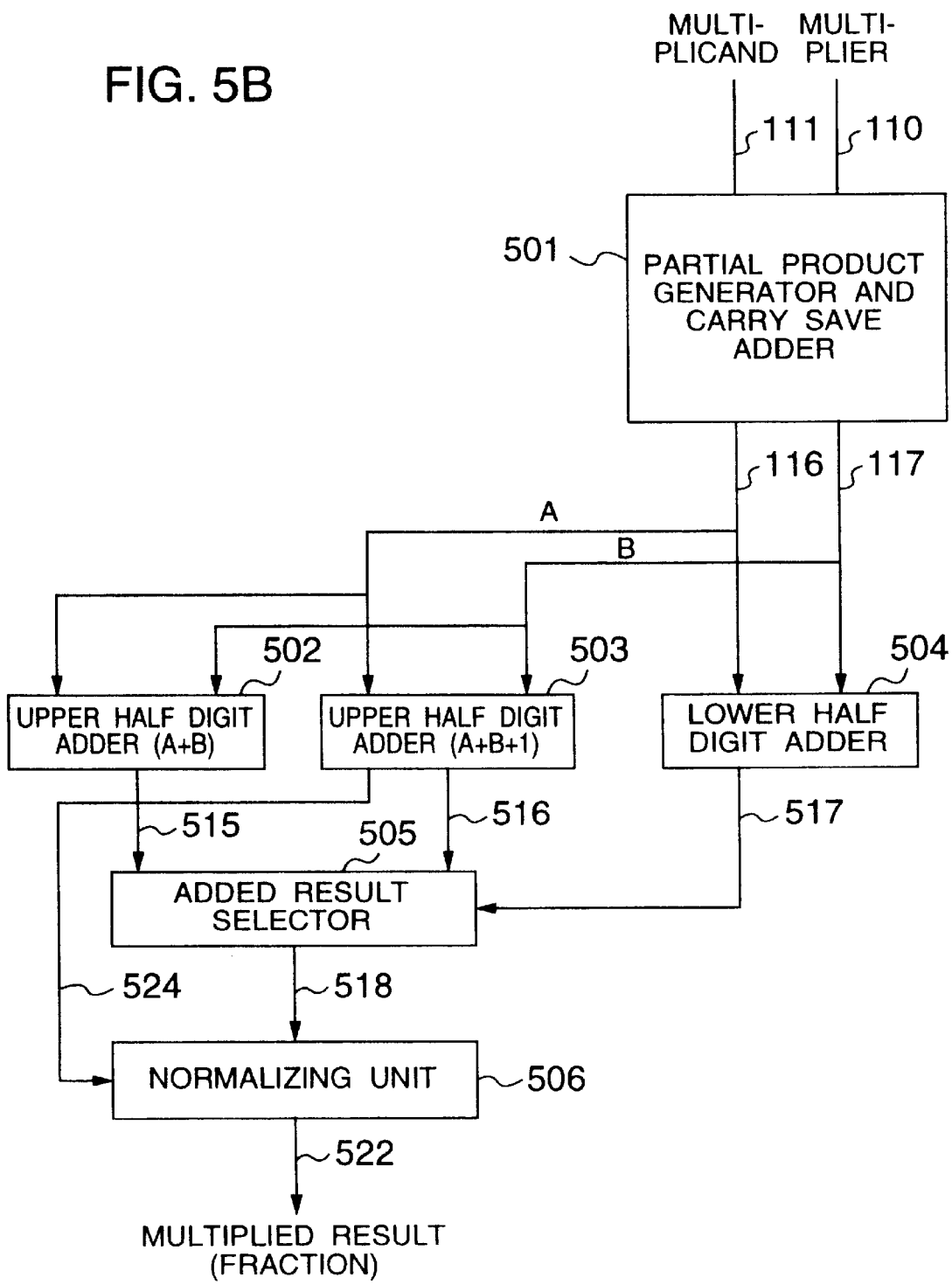

FIGS. 5A and 5B show the arrangement of the floating point multiplying apparatus which performs the normalizing shift according to the present invention. The difference between FIGS. 5A and 5B is that in FIG. 5A one input of a normalizing circuit 506 is a signal 520 output from an upper half digit adder (A+B) 502, while in FIG. 5B it is a signal 524 output from an upper half digit adder (A+B+1) 503.

The partial product generator and the carry save adder 501 operate to generate the partial products from the multiplicand 111 and the multiplier 110, and the carry sav adder 501 feeds the sum signal 116 and the carry signal 117. The upper half digit adder (A+B) 502 shown in FIG. 5A adds the upper digits A and B of the signals 116 and 117 and feeds a signal 515 and the most significant digit signal 520. The signal 515 represents the result of the carry propagate addition when no carry from the lower halt digits exists.

The upper half digit adder (A+B) 502 shown in FIG. 5B adds the upper digits of the signals 116 and 117 and feeds the signal 515. The signal represents the result of carry propagate addition when no carry from the lower half digits exists.

The upper half digit adder (A+B+1) 503 shown in FIG. 5A adds the upper digits of the signals 116 and 117 and feeds a signal 516. The signal 516 represents the result of carry propagate addition when a carry from the lower half digits exists.

The upper half digit adder (A+B+1) shown in FIG. 5B adds the upper digits of the signals 116 and 117 and feeds a signal 516 and the most significant digit signal 524. The signal 516 represents the result of carry propagate addition when a carry from the lower half digits exists.

The lower half digit adder adds the lower half digits of the signals 116 and 117 and generates a carry signal 517. The addition selector selects the signal 515 or 516 in response to the carry signal 517 and outputs the signal 518.

Hereafter, the description will be oriented to the normalizing shift method with reference to FIG. 30.

In a case that the multiplicand and the multiplier are both normalized numbers, the most significant digit of the multiplication result before normalizing is at a position one digit upper than the floating point or a position two digit upper than the floating point. When the most significant digit is at the position two digit upper than the floating point, the multiplication result is shifted by one bit to right. When the most significant digit is the position one digit upper than the floating point, the multiplication result is output without being shifted. Herein, the output signal 515 of the upper half digit adder (A+B) 502 calculated on the assumption that no carry is provided from the lower half digits and the output signal 516 of the upper half digit adder (A+B+1) 503 calculated on the assumption that a carry is provided from the lower half digits are divided into three cases as will be described below.

Case 1: Both most significant digits of A+B and A+B+1 are one digit upper than the floating point. (1 E1 E2 . . . E52) represents the upper digit (A+B), while (1 F1 F2 . . . F52) represents the upper digit (A+B+1).

Case 2: The most significant digit of A+B is one digit upper than the floating point, while the most significant digit of A+B+1 is two digit upper than the floating point. In this case, the value of the upper digit (A+B) takes no value except 1.11 . . . 1, while the value of the upper digit (A+B+1) takes no value except 10.00 . . . 0.

Case 3: Both most significant digits of A+B and A+B+1 are two digit upper than the floating point. (1 E0. E1 E2 . . . E52) represents the upper digit (A+B), while (1 F0. F1 F2 . . . F52) represents the upper digit (A+B+1).

In FIG. 30, the portion enclosed by a dotted line represents the output of the conventional normalizing shift.

(1) If no carry from the lower half digits exists, the upper half digit (A+B) signal 515 and the most significant digit signal 520 fed by the upper half digit adder (A+B) 502 are used.

(1a) If the bit indicated by the signal 520 is 1, the upper half digit (A+B) signal 515 is shifted by one bit to right before feeding it.

(1b) If the bit indicated by the signal 520 is 0, the upper half digit (A+B) signal 515 is fed as it is. (cases 1 and 2)

(2) If any carry from the lower half digits exists, the upper half digit (A+B+1) signal 516 and the most significant digit signal 524 fed by the upper half digit adder (A+B+1) 503 are used.

(2a) If the bit indicated by the signal 524 is 1, the upper half digit (A+B+1) signal 516 is shifted by one bit to right before feeding it (cases 2 and 3)

(2b) If the bit indicated by the signal 524 is 0, the upper half digit (A+B+1) signal 516 is fed as it is. (case 1)

The most significant digit signal used in the normalizing shift depends on the carry from the lower half digits. Signal 520 is used if no carry from the lower half digits exists as shown in FIG. 5A while signal 524 is used if a carry therefrom exists as shown in FIG. 5B. The signals 520 and 524 are passed through the selector with the carry working as a control signal from the lower half digits and are used for the normalizing shift.

As shown in FIG. 30, however, in respective cases, consider that the normalizing shift is executed using the signals 520 and 524. As indicated in the portion enclosed by a real line, the values are made equal to each other about the digits of the fraction except the implicit '1'. The floating point multiplying apparatus supplies the digits of the fraction except the implicit '1'. Hence, the most significant digit signal for determining the shift of the signal by one bit to right or the direct output of the signal in the normalizing shift may be any one of the signals 520 and 524. It means that the most significant digit signal used in the normalizing shift does not depend on the carry from the lower half digits.

Figure 31A:
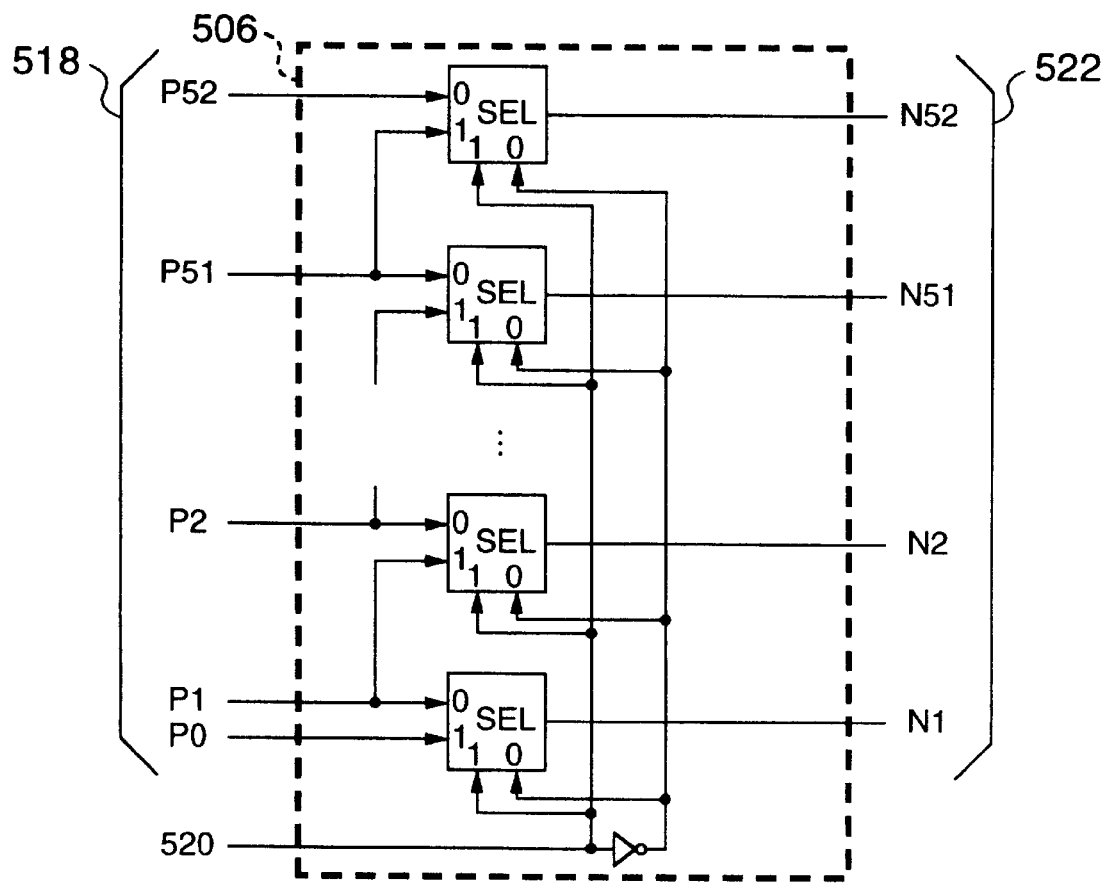
FIGS. 31A and 31B are circuit diagrams showing an arrangement of a normalizing shifter.
Figure 31B:
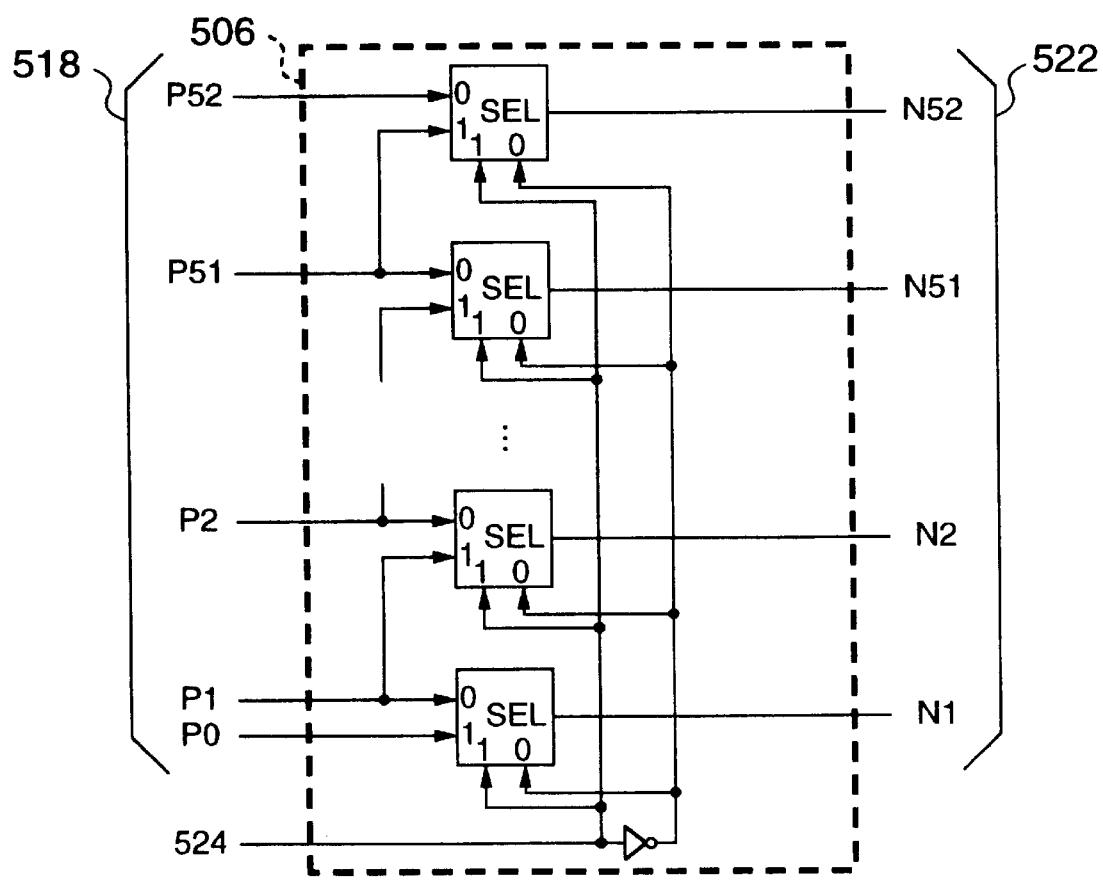
Figure 32:
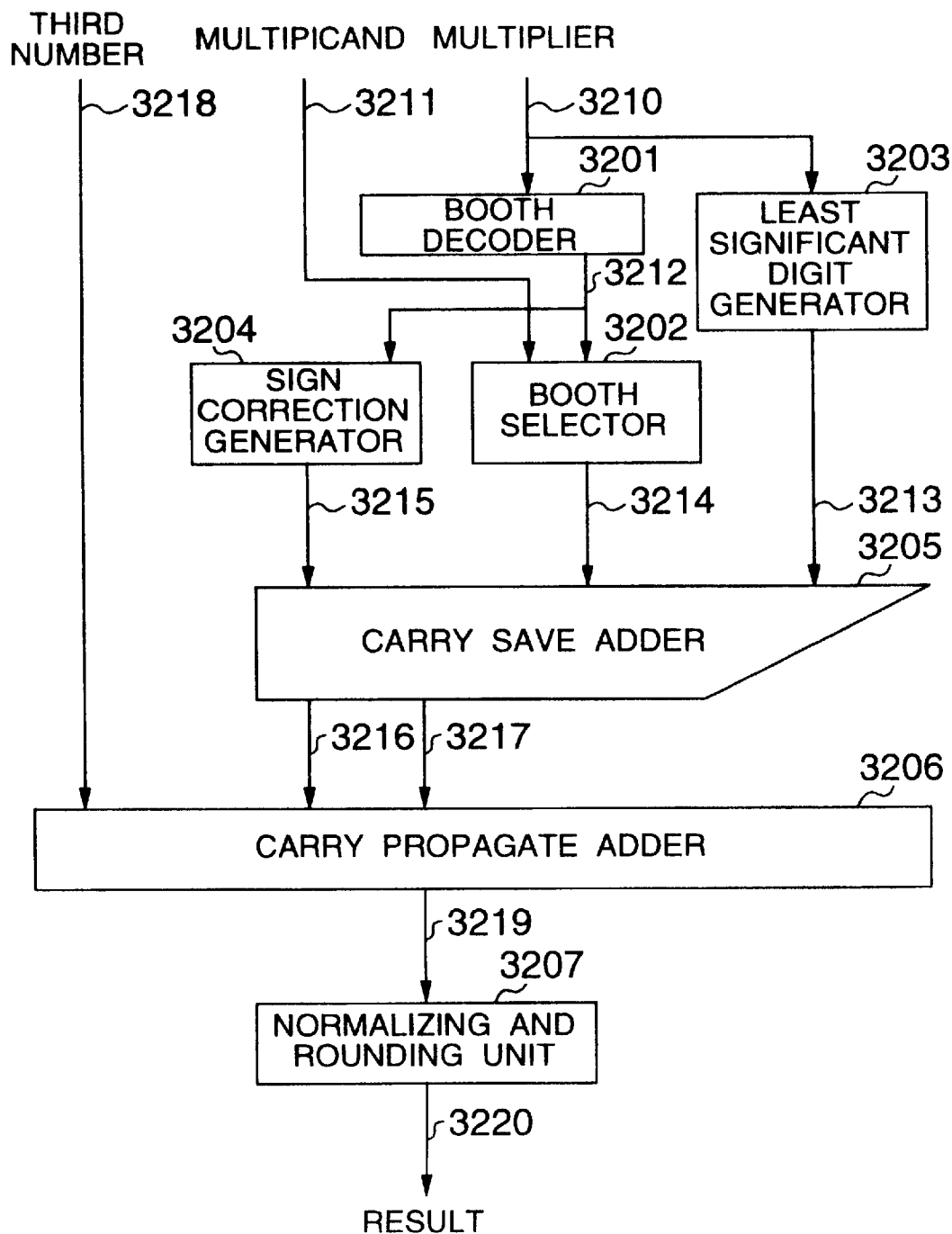
FIG. 32 is a block diagram showing an arrangement of a floating point operating apparatus for a sum of products according to a prior art.
Figure 33:
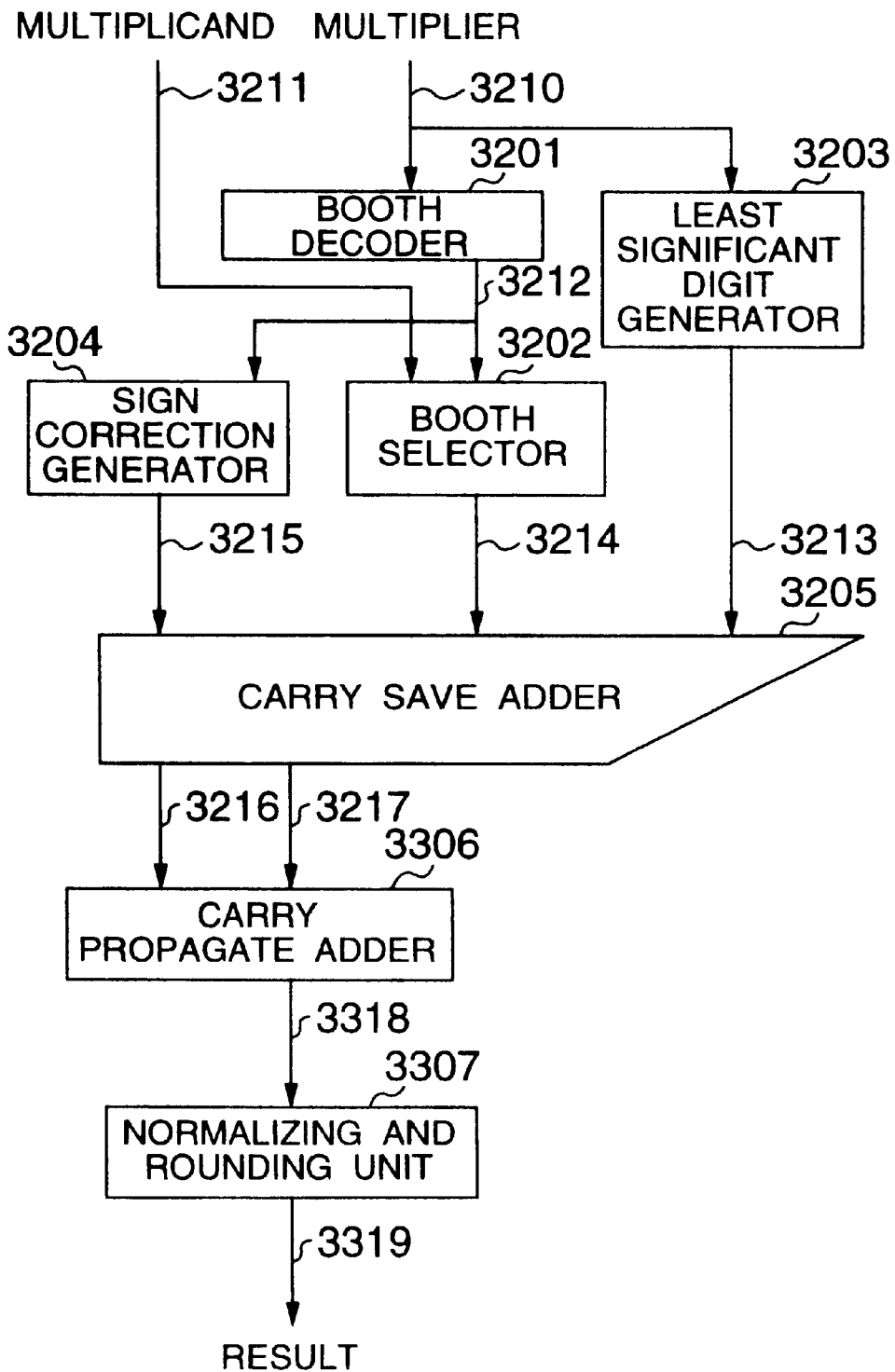
FIG. 33 is a block diagram showing an arrangement of a floating point multiplying apparatus according to another prior art.
Figure 34:
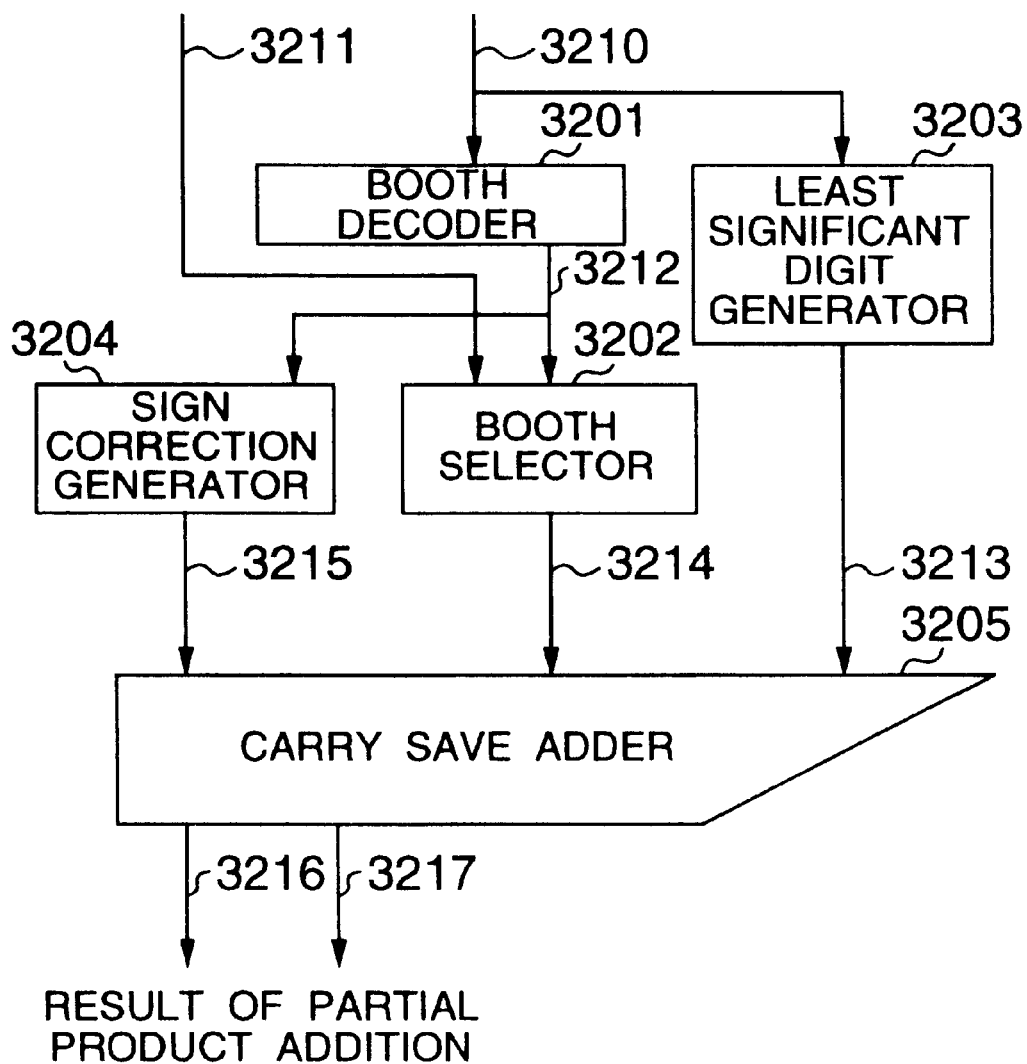
FIG. 34 is a block diagram showing an arrangement of a partial product adding apparatus according to another prior art.

FIG. 31 shows an arrangement of the normalizing circuit. The normalizing circuit shown in FIG. 31A uses the most significant digit signal 520 supplied from the upper half digit adder (A+B) 502, while the normalizing circuit shown in FIG. 31B uses the most significant digit signal 524 supplied from the upper half digit adder (A+B+1) as the normalizing shift signal. Both of these circuits offer the same result.

As set forth above, the addition of partial products, the method for matching the most significant digits to the same position, and the normalizing shift method have been described. Those methods may be put into practice combinationally or individually.

What is claimed is:

1. A method for adding partial products, each containing a predetermined number of digits generated based on a multiplier and a multiplicand, comprising the steps of:

receiving a series of partial products generated based on said multiplier and said multiplicand through a second-order Booth decoder;

subtracting one from two high-order digits of a first partial product when a second partial product next to said first partial product is negative;

adding one to digit positions of said second partial product that correspond to digit positions of said first partial product from which one was subtracted when said second partial product is negative; and repeating said subtracting and adding steps on all of said partial products, for adding all of said partial products without sign correction during a carry save addition of all partial products.

2. The method as claimed in claim 1, further comprising the steps of:

performing said carry save addition of all partial products without said sign correction when adding all of said partial products; and normalizing and rounding an added result from said carry save addition indicating a sum of partial products.

3. A floating point operating method for a sum of partial products, for performing a carry save addition of all partial products, each containing a predetermined number of digits generated based on a multiplier and a multiplicand, adding two outputs, sum and carry, from said carry save addition, to a third number, and normalizing and rounding said added result, comprising the steps of:

performing a carry save addition of all partial products, each containing a predetermined number of digits generated based on a multiplier and a multiplicand, without sign correction;

performing a carry propagate addition of digits of a third number that equal to and lower than the most significant digit of said carry save addition and two outputs, sum and carry, from said carry save addition;

making a selection between (1) the digits of said third number higher than the most significant digit of said carry save addition, and (2) incremented digits of said third number obtained by adding one to the digits of said third number higher than the most significant digit, based on carry from said most significant digit of said carry propagate addition; and normalizing and rounding an output of said carry propagate addition and an output of said selection to produce a signal for a sum of partial products.

4. An apparatus for adding partial products, each containing a predetermined number of digits generated based on a multiplier and a multiplicand, comprising:

a Booth decoder for performing a second-order Booth decode of said multiplier;

a Booth selector for generating said partial products from said multiplicand and an output of said Booth decoder, each partial product containing all digits except for two high-order digits;

a partial product corrector for correcting said two high-order digits of each partial product from said multiplier and said multiplicand, and generating corrected two high-order digits of each partial product;

a least significant digit generator for generating a least significant digit of each partial product from said multiplier to be added when generating a two's complement; and a carry save adder for performing a carry save addition on all digits of each partial product except for the two high-order digits, the corrected two high-order digits of each corresponding partial product, and the least significant digit.

5. The apparatus as claimed in claim 4, wherein assuming that the two high-order digits of said partial product n (n≧0) is R(n, 0) and R(n, 1), the digit of the most significant bit of said multiplicand X is X(1), and the multiplier Y to be decoded to generate the partial product n is Y(m), Y(m+1) and Y(m+2) in binary notation said partial product corrector performs the following operation:

$$R(n, 0) = (Y(m+1) \cdot Y(m+2) \cdot X(1)) + (Y(m) \cdot Y(m+1))$$

$$R(n, 1) = (Y(m) \cdot Y(m+2)) + (\overline{Y(m)} \cdot Y(m+1) \cdot \overline{Y(m+2)}) +$$

$$(Y(m) \oplus Y(m+1)) \cdot \overline{X(1)}.$$

6. The apparatus as claimed in claim 4 further comprising:

a carry propagate adder for adding outputs from said carry save adder; and a circuit for normalizing and rounding an added result from said carry propagate adder indicating a sum of partial products.

7. The apparatus as claimed in claim 4, further comprising:

a carry propagate adder for adding two outputs, sum and carry, of said carry save adder, and digits of a third number that equal to and lower than the most significant digit of said carry save adder;

an incrementor for adding one to digits of said third number higher than said most significant digit of said carry save adder;

a selector for selecting one of (1) the digits of said third number higher than said most significant digit of said carry save adder and (2) the output of said incrementor, based on any carry from the most significant digit of said carry propagate adder; and a circuit for normalizing and rounding the output of said selector and the output of said carry propagate adder to produce a signal for a sum of partial products.

8. The apparatus as claimed in claim 4, wherein each partial product comprises a 54 digit bit sequence.

9. The apparatus as claimed in claim 4, wherein said partial product corrector correcting the two high-order digits of each partial product by:

receiving said partial products generated based on said multiplier and said multiplicand;

subtracting one from the two high-order digits of a first partial product when a second partial product next to said first partial product is negative; and adding one to digit positions of said second partial product that correspond to digit positions of said first partial product from which one was subtracted when said second partial product is negative.

10. A method for multiplying floating point numbers expressed by a plurality of precisions, comprising the steps of:

when a multiplicand is a low precision number, matching a most significant digit of said multiplicand to a most significant digit of a high-precision number;

when a multiplier is a low precision number, matching a least significant digit of said multiplier to a least significant digit of a high-precision number;

calculating partial products;

generating correction digits by filling with one digits from a digit corresponding to a most significant digit of a sum of partial products when multiplying a maximum low precision number by a maximum low-precision number, to a digit right of the most significant digit of said sum of partial products when multiplying a maximum high-precision number by a maximum high-precision number;

adding said correction digits to said partial products;

normalizing and rounding the added result using a rounding position and a most significant digit of a result of multiplying a high-precision number by a high-precision number; and removing said correction digits from the normalized and rounded result.

11. The method as claimed in claim 10, wherein said precisions are double-precision and single-precision.

12. A floating point multiplying apparatus for multiplying floating point numbers expressed by a plurality of precisions, comprising:

a partial product generator for generating partial products, each partial product containing a predetermined number of digits so as to share rounding position by said plurality of precisions;

a partial product corrector for generating correction digits by filling with one digits from a digit corresponding to a most significant digit of a sum of partial products when multiplying a maximum low-precision number by a maximum low-precision numbers, to a digit right of the most significant digit of said sum of partial products when multiplying a maximum high-precision number by a maximum high-precision number in parallel to the generation of said partial products;

a carry save adder for adding said correction digits to each of said partial products; and a carry propagate adder for adding outputs of said carry save adder and outputting a most significant digit that is common to the plurality of precisions.

13. The apparatus as claimed in claim 12, wherein the plurality of precisions are single-precision and double-precision.

14. The apparatus as claimed in claim 12, wherein each partial product comprises a 54 digit bit sequence.

15. The apparatus as claimed in claim 12, wherein said partial product generator comprises:

a Booth decoder for performing a second-order Booth decode of said multiplier;

a Booth selector for generating said partial products from said multiplicand and an output of said Booth decoder, each partial product containing all digits except for two high-order digits;

a partial product corrector for correcting said two high-order digits of each partial product from said multiplier and said multiplicand, and generating corrected two high-order digits of each partial product; and a least significant digit generator for generating a least significant digit of each partial product from said multiplier to be added when generating a two's complement.

16. The apparatus as claimed in claim 15, wherein said partial product corrector correcting the two high-order digits of each partial product by:

receiving said partial products generated based on said multiplier and said multiplicand;

subtracting one from the two high-order digits of a first partial product when a second partial product next to said first partial product is negative; and adding one to digit positions of said second partial product that correspond to digit positions of said first partial product from which one was subtracted when said second partial product is negative.

17. A floating point multiplying method, comprising the steps of:

performing a carry save addition of partial products, each partial product containing a predetermined number of digits generated based on a multiplier and a multiplicand;

adding upper half digits of two outputs, sum and carry, from said carry save addition when no carry from lower half digits of said two outputs from said carry save addition exists, and adding the upper half digits of said two outputs, sum and carry, from said carry save addition when said carry from the lower half digits of said two outputs from said carry save addition exists;

selecting as an added result of the upper half digits of said two outputs of said carry save addition according to the presence or the absence of said carry from the lower half digits of said two outputs of said carry save addition;

performing a normalizing shift of said added result using any one of the most significant digit of the upper half digits when said carry from said lower half digits exists and when no carry from said lower half digits exists as a control signal, and producing a normalized result.

18. A floating point multiplying apparatus, comprising:

a partial product generator for generating partial products from a multiplier and a multiplicand;

a carry save adder for performing a carry save addition of said partial products;

a lower half digit adder for performing a carry propagate addition of lower half digits of outputs of said carry save adder;

a first upper half digit adder for performing a carry propagate addition of upper half digits of the outputs of said carry save adder when no carry from said lower half digits exists in parallel to the carry propagate addition of said lower half digits;

a second upper half adder for performing a carry propagate addition of the upper half digits of the outputs of said carry save adder when a carry from said lower half digits exists in parallel to the carry propagate addition of said lower half digits;

a selector for selecting one of the results of said first or second upper half digit adders as an added result according to the carry from the lower half digits; and a normalizing shifter for performing a normalizing shift on said added result using a most significant digit output from said first upper half digit adder as a control signal.

19. The apparatus as claimed in claim 18, wherein said partial product generator comprises:

a Booth decoder for performing a second-order Booth decode of said multiplier;

a Booth selector for generating said partial products from said multiplicand and an output of said Booth decoder, each partial product containing all digits except for two high-order digits;

a partial product corrector for correcting said two high-order digits of each partial product from said multiplier and said multiplicand, and generating corrected two high-order digits of each partial product; and a least significant digit generator for generating a least significant digit of each partial product from said multiplier to be added when generating a two's complement.

20. The apparatus as claimed in claim 19, wherein said partial product corrector correcting the two high-order digits of each partial product by:

receiving said partial products generated based on said multiplier and said multiplicand;

subtracting one from the two high-order digits of a first partial product when a second partial product next to said first partial product is negative; and adding one to digit positions of said second partial product that correspond to digit positions of said first partial product from which one was subtracted when said second partial product is negative.

21. The apparatus as claimed in claim 18, wherein said partial product adder comprises:

a Booth decoder for performing a second-order Booth decode of said multiplier;

a Booth selector for generating said partial products from said multiplicand and an output of said Booth decoder, each partial product containing all digits except for two high-order digits;

a partial product corrector for correcting said two high-order digits of each partial product from said multiplier and said multiplicand, and generating corrected two high-order digits of each partial product;

a least significant digit generator for generating a least significant digit of each partial product from said multiplier to be added when generating a two's complement; and a carry save adder for performing a carry save addition on all digits of each partial product except for the two high-order digits, the corrected two high-order digits of each corresponding partial product, and the least significant digit.

22. The apparatus as claimed in claim 21, wherein said partial product corrector correcting the two high-order digits of each partial product by:

receiving said partial products generated based on said multiplier and said multiplicand;

subtracting one from the two high-order digits of a first partial product when a second partial product next to said first partial product is negative; and adding one to digit positions of said second partial product that correspond to digit positions of said first partial product from which one was subtracted when said second partial product is negative.

23. The apparatus as claimed in claim 18, wherein each partial product comprises a 54 digit bit sequence.

24. A floating point multiplying apparatus, comprising:

a partial product adder for generating partial products from a multiplier and a multiplicand, and for performing a carry save addition of said partial products;

a lower half digit adder for performing a carry propagate addition of lower half digits of outputs of said carry save adder;

a first upper half digit adder for performing a carry propagate addition of upper half digits of outputs of said carry save adder when no carry from the lower half digits exists in parallel to the carry propagate addition of said lower half digits;

a second upper half digit adder for performing a carry propagate addition of the upper half digits of the outputs of said carry save adder when a carry from the lower half digits exists in parallel to the carry propagate addition of said lower half digits;

a selector for selecting one of the results of said first or second upper half digit adders as an added result according to the carry from the lower half digits; and a normalizing shifter for performing a normalizing shift on said added result using a most significant digit output from said second upper half digit adder as a control signal.

25. The apparatus as claimed in claim 24, wherein each partial product comprises a 54 digit bit sequence.

26. A floating point multiplying method for adding partial products, each containing a predetermined number of digits generated based on a multiplier and a multiplicand, normalizing and rounding an added result, said floating point multiplying method comprising the steps of:

receiving a series of partial products generated based on said multiplier and said multiplicand, via a Booth decoder;

subtracting one from two high-order digits of a first partial product when a second partial product next to said first partial product is negative;

adding one to digit positions of said second partial product that correspond to digit positions of said first partial product from which one was subtracted when said second partial product is negative;

repeating said subtracting and adding steps on all of said partial products, for adding all of said partial products without sign correction;

performing a carry save addition of all partial products without said sign correction when adding all of said partial products; and normalizing and rounding an added result from said carry save addition indicating a sum of partial products.

27. A floating point multiplying apparatus for sum of partial products, comprising:
  a partial product adding apparatus for adding partial products, each containing a predetermined number of digits generated based on a multiplier and a multiplicand, said partial product adding apparatus comprising:
    a Booth decoder for performing a second-order Booth decode of said multiplier;
    a Booth selector for generating said partial products from said multiplicand and an output of said Booth decoder, each partial product containing all digits except for two high-order digits;
    a partial product corrector for correcting said two high-order digits of each partial product from said multiplier and said multiplicand, and generating corrected two high-order digits of each partial product;
    a least significant digit generator for generating a least significant digit of each partial product from said multiplier to be added when generating a two's complement; and
    a carry save adder for performing a carry save addition on all digits of each partial product except for the two high-order digits, the corrected two high-order digits of each corresponding partial product, and the least significant digit;
  a carry propagate adder for adding outputs from said carry save adder of said partial product adding apparatus; and
  a circuit for normalizing and rounding an added result from said carry propagate adder indicating a sum of said partial products.

28. A floating point multiplying apparatus for sum of partial products, comprising:
  a partial product adding apparatus for adding partial products, each containing a predetermined number of digits generated based on a multiplier and a multiplicand, said partial product adding apparatus comprising:
    a Booth decoder for performing a second-order Booth decode of said multiplier;
    a Booth selector for generating said partial products from said multiplicand and an output of said Booth decoder, each partial product containing all digits except for two high-order digits;
    a partial product corrector for correcting said two high-order digits of each partial product from said multiplier and said multiplicand, and generating corrected two high-order digits of each partial product;
    a least significant digit generator for generating a least significant digit of each partial product from said multiplier to be added when generating a two's complement; and
    a carry save adder for performing a carry save addition on all digits of each partial product except for the two high-order digits, the corrected two high-order digits of each corresponding partial product, and the least significant digit;
  a carry propagate adder for adding two outputs, sum and carry, from said carry save adder of said partial product adding apparatus, and digits of a third number that is not greater than the most significant digit of said carry save adder;
  an incrementor for adding one to digits of said third number higher than said most significant digit of said carry save adder;
  a selector for selecting one of (1) the digits of said third number higher than said most significant digit of said carry save adder, and (2) the output of said incrementor based on any carry from the most significant digit of said carry propagate adder; and
  a circuit for normalizing and rounding an output of said selector and an output of said carry propagate adder to produce a signal for a sum of said partial products.

* * * * *